(12) United States Patent
Jones, Jr.

(10) Patent No.: US 10,863,741 B2
(45) Date of Patent: *Dec. 15, 2020

(54) HERBICIDAL COMPOSITIONS

(71) Applicant: HOMS, LLC, Pittsboro, NC (US)

(72) Inventor: Allen L. Jones, Jr., Pittsboro, NC (US)

(73) Assignee: HOMS, LLC, Pittsboro, NC (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/892,355

(22) Filed: Feb. 8, 2018

(65) Prior Publication Data

US 2018/0160683 A1      Jun. 14, 2018

Related U.S. Application Data

(63) Continuation-in-part of application No. PCT/US2016/045937, filed on Aug. 7, 2016.

(60) Provisional application No. 62/202,898, filed on Aug. 9, 2015.

(51) Int. Cl.

| *A01N 37/02* | (2006.01) |
| *A01N 25/02* | (2006.01) |
| *A01N 25/04* | (2006.01) |
| *A01N 65/06* | (2009.01) |
| *A01N 65/20* | (2009.01) |
| *A01N 65/40* | (2009.01) |

(52) U.S. Cl.
CPC .............. *A01N 37/02* (2013.01); *A01N 25/02* (2013.01); *A01N 25/04* (2013.01); *A01N 65/06* (2013.01); *A01N 65/20* (2013.01); *A01N 65/40* (2013.01)

(58) Field of Classification Search
CPC .... A01N 37/02; A01N 2300/00; A01N 25/02; A01N 25/04
See application file for complete search history.

(56) References Cited

U.S. PATENT DOCUMENTS

| 5,612,047 A | 3/1997 | Duffy et al. |
| 5,700,759 A | 12/1997 | Caulder et al. |
| 6,559,110 B1 * | 5/2003 | Lopes ................ A61K 8/23 424/44 |
| 2007/0049496 A1 | 3/2007 | Messerschmidt et al. |
| 2008/0153708 A1 | 6/2008 | Jones |
| 2009/0111697 A1 | 4/2009 | Campbell et al. |
| 2010/0227010 A1 | 9/2010 | Jones |
| 2010/0269731 A1 | 10/2010 | Jespersen et al. |
| 2012/0035054 A1 | 2/2012 | Ehr et al. |
| 2013/0253059 A1 | 9/2013 | Man et al. |
| 2018/0168149 A1 * | 6/2018 | Jones, Jr. .............. A01N 37/02 |

FOREIGN PATENT DOCUMENTS

| CN | 105112179 | * 12/2015 | .............. C11D 9/02 |
| GB | 2235930 | * 3/1991 | .............. C11D 9/02 |

OTHER PUBLICATIONS

Silalahi et al. ("Burn Wound Healing Activity of Hydrolyzed Virgin Coconut Oil" International Journal of PharmTech Research 2015 vol. 8(1), 67-73).*
Orsavova et al. ("Fatty Acids Composition of Vegetable Oils and Its Contribution to Dietary Energy Intake and Dependence of Cardiovascular Mortality on Dietary Intake of Fatty Acids" Int. J. Mol. Sci. 2015, 16, 12871-12890).*
CN 105112179 machine translation (C) 2020 Clarivate Analytics.*

* cited by examiner

*Primary Examiner* — Kortney L. Klinkel
(74) *Attorney, Agent, or Firm* — Hultquist, PLLC; Steven J. Hultquist

(57) ABSTRACT

Herbicidal and pest-control compositions are variously described, including soaps as well as free fatty acids as active ingredients. The disclosed compositions may be constituted in a concentrated form, or the composition may be further diluted for application. Herbicidal compositions of the disclosure may be employed to selectively target unwanted vegetation without a systemic mode of action, and may be used to control a wide variety of unwanted plants, e.g., weeds, woody brush, trees, and/or grasses, in a locus that contains or is susceptible to emergence thereof.

24 Claims, 25 Drawing Sheets
(25 of 25 Drawing Sheet(s) Filed in Color)

Woody Brush Before

Woody Brush After 1 Day

Woody Brush After 1 Week

Woody Tree After 1 Day

Woody Tree After 1 Week

Johnson Grass Before

Johnson Grass After 1 Day

Johnson Grass After 1 Week

Crab Grass Before

Crab Grass After 1 Day

Thistle Weed Before

Thistle Weed After 1 Day

Thistle Weed After 1 Week

Formula G

Formula H

Prior to Spraying large briars, ivy and weeds 1 day after Spraying large briars, ivy and weeds Formula H Prior to Spraying Grass area 1 days after Spraying Grass Area

HERBICIDAL COMPOSITIONS

CROSS-REFERENCE TO RELATED APPLICATION

This is a continuation-in-part under the provisions of 35 U.S.C. 120 of International Patent Application PCT/US16/45937 filed Aug. 7, 2016 in the name of Allen L. Jones for "HERBICIDAL COMPOSITIONS", which in turn claims the benefit under 35 U.S.C. 119 of U.S. Provisional Patent Application 62/202,898 filed Aug. 9, 2015 in the name of Allen L. Jones for "HERBICIDAL COMPOSITIONS". The disclosures of International Patent Application PCT/US16/45937 and U.S. Provisional Patent Application 62/202,898 are hereby incorporated herein in their respective entireties, for all purposes.

FIELD

The present disclosure relates to herbicidal compositions that are cidally effective against unwanted vegetation such as grasses, woody brush, trees, and weeds, and to methods of combating unwanted vegetation in loci containing or susceptible to emergence of same. The disclosure also relates to compositions of such type that are herbicidal as well as pest-combating in character.

DESCRIPTION OF THE RELATED ART

In the use of phytotoxic agents to combat unwanted plant species such as grasses, woody brush, trees, and weeds in various locations in which they grow, a wide variety of herbicidal compositions have been developed and are in use. These compositions in many cases are highly effective in killing grasses, woody brush, trees, and weeds, but have attendant environmental toxicity or other deficiencies in health and safety characteristics that render them undesirable for general use.

For a sustainable herbicide, it is imperative to develop an effective herbicidal action that is not systemic to control vegetation without detrimental effects to bees and other pollinator populations. Moreover, a sustainable choice would also include a mode of action to which vegetation cannot develop resistance, and such sustainable choice would exclude herbicidal agents having a mode of action that is detrimental to humans and animals.

Many "natural" or "environmentally friendly" herbicidal agents that have been used to date have not been highly effective, and many require full sun, relatively high temperatures, and a period without rain in order to work effectively. In general, these agents have not exhibited the capability of retaining their initial active character for extended periods of time in controlling unwanted vegetation, and other synthetic compositions have been used to replace them. Unfortunately, such other synthetic compositions in many cases have detrimental effects on beneficial insect populations, as well as adversely affecting human and animal health.

Many of the same issues encountered with herbicidal agents are associated with synthetic pesticides. Synthetic pesticides in general have been linked to a wide range of human health hazards, ranging from short-term impact such as headaches and nausea to chronic impacts, such as cancer, reproductive system pathology, and endocrine disruption. Most formulations of effective insecticides use synthetic toxic compounds that are systemic and also persist in the soil, negatively affecting habitats for plants and pollinator species, and run off into waterways where they adversely affect aquatic life. Ethanol is used in many pesticide formulas to dissolve synthetic toxic compounds, but ethanol formulations are highly flammable (Flammability of Class 3), volatile, and can create significant hazards to human health. The use of both synthetic insecticides and herbicides on residential, farm, and industrial properties, and the use of synthetic insecticides on livestock and pets, have devastated a wide variety of habitats and negatively affected human and animal health.

In consequence, the art continues to seek improvements in herbicidal compositions that are effective for killing unwanted vegetation such as grasses, woody brush, trees, and weeds, but which are benign to other plants and the environment generally, and otherwise entail no health or safety hazards to persons applying such compositions, or persons who are present in locations to which such compositions have been applied. The art also has need of compositions having herbicidal and/or pesticidal character, which are environmentally benign and pose no health risks to humans and/or animals.

SUMMARY

The present disclosure relates to herbicidal compositions that are usefully employed to eliminate unwanted vegetation, e.g., grasses, woody brush, trees, and weeds, from areas in which they are not wanted, as well as to methods of combating undesired grasses, woody brush, trees, and weeds in such areas. The disclosure also encompasses compositions of such type, which have pest-combating, e.g., pesticidal and/or pest-repellent character, and therefore can be applied to plants, animals, human skin, clothing, etc., to combat insect, arthropod, and other pests.

In one aspect, the disclosure relates to a herbicidal composition comprising (i) one or more soap and/or detergent ingredients, and (ii) free fatty acid(s).

In another aspect, the disclosure relates to a pest control composition, comprising a combination of ingredients selected from the group consisting of:
(a) coconut oil soap and free fatty acid(s), for yard and crop insect and arthropod control;
(b) coconut oil soap, free fatty acid(s), and sodium lauryl sulfate, for yard and crop insect and arthropod control;
(c) any of the foregoing (a) and (b), further comprising modified vegetable oil(s) to impart increased cidal penetration and duration (weatherproofing), or increased insect and arthropod repellency;
(d) any of the foregoing (a)-(c), in a formulation constituted for one or more of deer repellence, insect repellence, and arthropod repellence;
(e) MCT soap and free fatty acids, optionally with modified vegetable oil(s), in a formulation constituted for insecticidal and arthropod-repellent applications;
(f) a formulation (e), further comprising sodium lauryl sulfate;
(g) any of the foregoing (a)-(f), in a formulation constituted for insect and arthropod control on articles or structures comprising wood and/or cellulosic material; and
(h) any of the foregoing (a)-(g), further comprising additional insect and/or arthropod control agents.

In a further aspect, the disclosure relates to an insecticidal and arthropod-repellent composition comprising, including MCT soap and free fatty acids, optionally with modified vegetable oil(s).

Another aspect of the disclosure relates to a herbicidal and/or pesticidal composition, selected from the group consisting of Formula A through Formula M, as described more fully hereinafter.

Yet another aspect of the invention relates to a method of combating unwanted vegetation in a locus containing or susceptible to emergence thereof, said method comprising administering to said locus an effective amount of a herbicidal composition of the present disclosure.

Another aspect of the disclosure relates to a method of combating pests, comprising applying to the pests and/or an environment containing or susceptible to presence or incursion of pests, a pest-combating composition of the present disclosure.

In one aspect, the disclosure relates to a herbicidal composition, comprising (i) soy methyl ester, (ii) sodium laurel sulfate, and (iii) $C_6$-$C_{12}$ fatty acid(s).

In another aspect, the disclosure relates to a herbicidal composition, comprising (i) soy methyl ester, (ii) sodium laurel sulfate, (iii) $C_6$-$C_{12}$ fatty acid(s), and (iv) diluent, wherein the soy methyl ester has a concentration in a range of from 1% to 60%, the sodium laurel sulfate has a concentration in a range of from 0.1 to 20%, the $C_6$-$C_{12}$ fatty acid(s) has a concentration in a range of from 1% to 60%, and the diluent has a concentration in a range of from 1 to 97.9%, wherein said concentrations are percentages by weight, based on total weight of ingredients (i)-(iv), and wherein the amounts of all ingredients (i), (ii), (iii), and (iv) total to 100 weight percent.

A further aspect of the disclosure relates to a herbicidal composition, comprising: Soy Methyl Ester, Capric Acid, Capryllic Acid, Lauric Acid, Sodium Lauryl Sulfate, Glycerol Monostearate, Potassium Oleate, Glycerin, and Water.

A still further aspect of the disclosure relates to a herbicidal composition, comprising: Soy Methyl Ester, Sodium Lauryl Sulfate, Lauric Acid, Glycerin, Potassium Oleate, Glycerol Monostearate, and Water.

Another aspect of the disclosure relates to a herbicidal composition, comprising: Soy Methyl Ester, Capric Acid, Capryllic Acid, Sodium Lauryl Sulfate, Lauric Acid, Peg40 Castor Oil, Polysorbate 20, Potassium Oleate, Sodium Bicarbonate, Glycerol Monostearate, Citric Acid, Glycerin, Sodium Benzoate, and Water.

Yet another aspect of the disclosure relates to a herbicidal composition, comprising: Soy Method Ester, a $C_6$, $C_8$, $C_{10}$, $C_{12}$ fatty acid mixture, Sodium Lauryl Sulfate, Glycerin, Pancreatic Amylase, Fungal Lipase, Cellulase, Subtilisin, Amylase, and Proteinase.

The disclosure in another aspect relates to a herbicidal composition comprising an MCT oil-based soap.

A further aspect of the disclosure relates to a method of combating unwanted plants and/or algae in a locus containing same, such method comprising applying to the unwanted plants and/or algae a cidally effective amount of an herbicidal composition of the present disclosure, as variously described herein.

Another aspect of the disclosure relates to an insect control composition comprising coconut oil soap and free fatty acids.

Yet another aspect of the disclosure relates to a method of controlling unwanted insects and/or arthropods in a locus containing or susceptible to incursion of same, such method comprising applying to the locus an insect controllingly effective amount of an insect control composition of the disclosure, as variously described herein.

Other aspects, features and embodiments of the disclosure will be more fully apparent from the ensuing description and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
FIG. 1 is a photograph of a woody brush area, prior to any treatment.

The present disclosure relates to herbicidal compositions that are cidally effective against unwanted vegetation, such as grasses, woody brush, trees, and weeds, and to methods of use of such compositions to combat grasses, woody brush, trees, and weeds in loci in which same are not desired. The disclosure also relates to compositions of herbicidal character, which additionally have pest-combating utility.

The herbicidal compositions of the present disclosure may be provided as a concentrate that is diluted with a suitable diluent to yield a formulation for administration to a locus in which undesired vegetation such as grasses, woody brush, trees, and weeds are present, or in which germination and growth of such grasses, woody brush, trees, and weeds may occur if the locus is untreated. Alternatively, the composition may be provided in a ready to use (RTU) form.

"$C_6$-$C_{12}$ fatty acid(s)" as referred to herein comprise one or more fatty acids having carbon number(s) in a range of from 6 to 12. Preferred $C_6$-$C_{12}$ fatty acids have even-numbered carbon numbers, i.e., $C_6$, $C_8$, $C_{10}$, and $C_{12}$, and the $C_6$-$C_{12}$ fatty acid(s) ingredient may therefore comprise a combination of such $C_6$, $C_8$, $C_{10}$, and $C_{12}$, fatty acids, or a selected one or ones thereof, or alternatively a combination of any other fatty acids having carbon numbers in the range of from 6 to 12, or a selected one or ones thereof. The $C_6$-$C_{12}$ fatty acid(s) in specific embodiments may for example include a mixture of $C_8$, $C_{10}$, and $C_{12}$ fatty acids, a mixture of $C_6$ and $C_{10}$ fatty acids, a mixture of $C_8$ and $C_{10}$, fatty acids, or a mixture of $C_{10}$ and $C_{12}$ fatty acids.

Correspondingly, "$C_8$-$C_{12}$ fatty acid(s)" as referred to herein comprise one or more fatty acids having carbon number(s) in a range of from 8 to 12. Preferred $C_8$-$C_{12}$ fatty acids have even-numbered carbon numbers, i.e., $C_8$, $C_{10}$, and $C_{12}$, and the $C_8$-$C_{12}$ fatty acid(s) ingredient may therefore comprise a combination of such $C_8$, $C_{10}$, and $C_{12}$, fatty acids, or a selected one or ones thereof, or alternatively a combination of any other fatty acids having carbon numbers in the range of from 8 to 12, or a selected one or ones thereof. The $C_8$-$C_{12}$ fatty acid(s) in specific embodiments may for example include a mixture of $C_8$, $C_{10}$, and $C_{12}$ fatty acids, or a mixture of $C_8$ and $C_{10}$, fatty acids, or a mixture of $C_{10}$ and $C_{12}$ fatty acids.

In various embodiments, the compositions of the present disclosure may be provided in concentrate form or in diluted, e.g., ready to use (RTU) form, and in any of such forms, the compositions may comprise, consist, or consist essentially of, the ingredients variously specified herein, or selected one or ones thereof. Relative proportions of ingredients in such compositions may be readily determined, within the skill in the art, based on the disclosure herein, without undue experimentation.

The present disclosure relates to a variety of herbicidal compositions including (i) one or more soap and/or detergent ingredients, and (ii) free fatty acid(s).

The herbicidal compositions in various formulations may include soap ingredients such as MCT soap and/or coconut oil soap. MCT (medium chain triglycerides) soap is derived from fractionated coconut oil.

The herbicidal compositions in other formulations may include one or more detergent ingredients. In various embodiments, the one or more detergent ingredients may comprise sodium laurel sulfate.

In other formulations, the herbicidal compositions of the disclosure may comprise soap and detergent ingredients, e.g., (i) MCT soap and sodium lauryl sulfate, (ii) coconut oil soap and sodium lauryl sulfate, (iii) MCT soap, coconut oil soap, and sodium lauryl sulfate.

Accordingly, the phrase "one or more soap and/or detergent ingredients" is intended to be broadly construed to encompass (a) one or more soap ingredients, (b) one or more detergent ingredients, and (c) one or more soap ingredients in combination with one or more detergent ingredients.

The (ii) free fatty acid(s) that are utilized with the (i) one or more soap and/or detergent ingredients, can be of any suitable type. In various formulations, the free fatty acid(s) comprise $C_6$-$C_{12}$ fatty acid(s), e.g., $C_6$ and/or $C_8$ and/or $C_{10}$ and/or $C_{12}$ fatty acid(s). In other formulations, the free fatty acid(s) comprise $C_8$-$C_{12}$ fatty acid(s), e.g., $C_8$ and/or $C_{10}$ and/or $C_{12}$ fatty acid(s).

The free fatty acids in various embodiments may include caproic acid as a $C_6$ fatty acid, caprylic acid as a $C_8$ fatty acid, capric acid as a $C_{10}$ fatty acid, and lauric acid as a $C_{12}$ fatty acid.

Accordingly, the herbicidal compositions of the present disclosure including (i) one or more soap and/or detergent ingredients, and (ii) free fatty acid(s) may in various specific formulations comprise any of the following combinations of ingredients: (a) MCT soap, and $C_8$ and/or $C_{10}$ and/or $C_{12}$ free fatty acid(s); (b) coconut oil soap, and $C_8$ and/or $C_{10}$ and/or $C_{12}$ free fatty acid(s); (c) MCT soap and coconut oil soap, and $C_8$ and/or $C_{10}$ and/or $C_{12}$ free fatty acid(s); (d) any of the foregoing (a)-(c), further comprising sodium lauryl sulfate; (e) sodium lauryl sulfate, and $C_8$ and/or $C_{10}$ and/or $C_{12}$ free fatty acid(s); (f) any of the foregoing (a)-(d), further comprising modified vegetable oil that is effective as a penetrant and solvent into woody stem plants; and (g) any of the foregoing (a)-(f), further comprising additional herbicidal actives.

The additional herbicidal actives in various embodiments may comprise natural herbicidal ingredients such as cedarwood oil or other natural herbicidal ingredients, and/or synthetic herbicidal ingredients of suitable type or types.

The herbicidal compositions of the present disclosure include formulations that in addition to herbicidal activity are pesticidal, e.g., insecticidal, in character. In various formulations, such herbicidal compositions having insecticidal or other pesticidal activity, comprise coconut oil soap, and free fatty acid(s), e.g., $C_8$ and/or $C_{10}$ and/or $C_{12}$ free fatty acid(s).

The present disclosure also contemplates various pest control compositions, comprising a combination of ingredients selected from the group consisting of: (a) coconut oil soap and free fatty acid(s), for yard and crop insect and arthropod control; (b) coconut oil soap, free fatty acid(s), and sodium lauryl sulfate, for yard and crop insect and arthropod control; (c) any of the foregoing (a) and (b), further comprising modified vegetable oil(s) to impart increased cidal penetration and duration (weatherproofing), or increased insect and arthropod repellency; (d) any of the foregoing (a)-(c), in a formulation constituted for one or more of deer repellence, insect repellence, and arthropod repellence; (e) MCT soap and free fatty acids, optionally with modified vegetable oil(s), in a formulation constituted for insecticidal and arthropod-repellent applications; (f) a formulation (e), further comprising sodium lauryl sulfate; (g) any of the foregoing (a)-(f), in a formulation constituted for insect and arthropod control on articles or structures comprising wood and/or cellulosic material; and (h) any of the foregoing (a)-(g), further comprising additional insect and/or arthropod control agents.

Compositions of the present disclosure when applied to vegetation function as animal repellents on such vegetation, since animals do not want to eat the treated vegetation, thereby protecting such vegetation.

The additional insect and/or arthropod control agents in the above pest control compositions may comprise pest-control oils such as cedarwood oil and/or geraniol, and/or synthetic and/or natural pest-control active ingredient(s).

Thus, the disclosure in various aspects provides insecticidal soap compositions with specific vegetable fatty acid profiles and penetrating ingredients, to greatly enhance herbicidal activity and control of vegetation using natural ingredient-containing sustainable compositions that are effective for fortifying soil and environmental habitats. Increased effectiveness of such formulations is achievable with higher dilutions with water, while remaining effective in rain, low sun, and/or low temperature conditions.

In herbicidal compositions of the present disclosure, comprising detergent and/or soap ingredients, the detergent (e.g., sodium lauryl sulfate and/or other detergent(s)) and/or soap action dissolves waxy portions of vegetation allowing penetration of fatty acids into the vegetation. The vegetable fatty acid profile content is an important aspect of the herbicidal activity toward grass, weeds, and woody stem plants, in making the product selective or non-selective in character. A penetrating solvent may be used for the herbicidal actives in the composition to penetrate into the plant mass and most significantly woody stem plants. The amount of penetrant ingredient(s) that is effective to dissolve the herbicidal active ingredient(s) and mediate penetration into woody stems and spread into the plant is a function of the vegetable fatty acid content in the modified vegetable oil when present in the composition. Control of different types of vegetation can be made selective by the vegetable fatty acid profile employed with the detergent or soap that is selected for the composition, and the type and amount of the penetrant that is used, as selected with specific vegetable fatty acids to dissolve herbicidal active(s) into the plant cells.

In general, the use of detergent such as sodium lauryl sulfate and specific fatty acids, in the absence of herbicidal soap ingredient(s), affords good "burn down" results in grasses and weeds, but a penetrant is typically necessary to kill woody stem plants. Modified vegetable oil with a specific fatty acid profile enables the herbicidal active ingredient(s) to penetrate woody stems quickly and is rain-proof.

In various compositions of the present disclosure, coconut oil soap and/or MTC soap can be used in place of or in addition to detergent ingredients such as sodium lauryl sulfate. In various implementations, the soap content may be carefully saponified and partially acidulated to have free fatty acids with specific ranges of a desired fatty acid profile so that use of detergent ingredients such as sodium lauryl sulfate is not necessary. The detergent and/or soap action dissolves the waxy portion of the vegetation to aid in penetrating the herbicidal active(s) into the vegetation. The vegetable fatty acid profile causes a non-systemic action to destroy the cell wall of the plant and to act as a desiccant.

In various compositions of the disclosure, a detergent and/or soap may be utilized for what he plant penetration, together with an effective herbicidal vegetable fatty acid profile from coconut oil or palm oil and methylated seed oil (also known as modified vegetable oil). The methylated seed oil may be obtained from soybean oil, but can be derived from other vegetable oils including canola oil, palm oil, and others. The amount of modified vegetable oil in the composition is a portion or percentage of the amount of fatty acid oil content and detergent that is used, in order to penetrate the target vegetation and to waterproof the herbicidal action.

Thus, for contact action without penetration, the herbicidal composition may be formulated without modified vegetable oil component(s), to provide a highly rapid vegetation burn-down that does not affect other vegetation. Such formulation of the herbicidal composition may for example be highly beneficial to berry growers for control of grass and weeds. For woody stem control, modified vegetable oil advantageously is used to penetrate the woody plant, including, for example, tree limbs or entire trees. Contact is required, but the composition does not act systemically in that the herbicidal active ingredient(s) are not carried throughout the part of the plant or tree that is not contacted with the composition. Control of vegetation may thereby be conducted selectively and by non-systemic mode of action.

Further non-selectivity of particular plant species may be obtained by varying the fatty acid profile, and the detergent and/or soap content of the composition. For example, control of broad leaf plants without killing of grass may be accommodated by use of positions of the disclosure that do not contain modified vegetable oil, so that detergent and/or soap content, together with a fatty acid profile for broad leaf weeds, is utilized. For woody stem plants, a specific fatty acid profile may be selected so as not to kill grass, using compositions containing modified vegetable oil.

Thus, modified vegetable oil as a penetrant may optionally be employed with or without the vegetable fatty acid profile, depending on the nature and extent of penetration that is desired. Various adjuvants may be employed that have a vegetable fatty acid content that is effective to enhance the effectiveness of penetration and solvating effect for the herbicidal activity. Advantageously, when modified vegetable oil is used as a penetrant, the specific fatty acid profile of the modified vegetable oil penetrant is selected so that the modified vegetable oil is readily biodegradable, while simultaneously being effective is a solvent for the herbicidal active(s) and the woody stem plants. Vegetable fatty acid profile is important in human nutrition, and can additionally be formulated for non-systemic herbicidal activity that is readily biodegradable to provide soil nutrients and food for microorganisms.

Vegetable fatty acids useful in the practice of the present disclosure are found in coconut and/or soybean oil, which may be employed singly or in mixture with one another in compositions of the present disclosure. Coconut oil is a vegetable oil that derives from a coconut palm (*Cocos nucifera*) that is pollinated by bees. There are additional vegetable sources with similar fatty acid content, such as palm oil and canola oil. In addition to natural coconut oil and/or natural soybean oil, the present disclosure encompasses compositions employing mixtures that are identical to natural products obtained from synthetic or natural oils, which correspond in their mixture to natural products.

Sodium lauryl sulfate, or SLS (CAS Number 151-21-3), is a preferred detergent ingredient in compositions of the present disclosure that comprise detergent. Sodium lauryl sulfate is approved for food use as a pesticide in the United States. It is preferred in conjunction with a vegetable fatty acid profile for herbicidal activity, and may be made from lauric acid derived from coconut oil or palm oil.

MCT soap utilized in various compositions of the present disclosure may be made by saponification of MCT oil performed with potassium hydroxide (KOH) or other saponification agent according to the Saponification Value of MCT, with water used to create soap being at minimum 50% and at maximum 60%. The soap form may be acidulated partially with citric acid to free fatty acids $C_8$ and $C_{10}$, or free fatty acids $C_8$ and $C_{10}$ may be separately added to the MCT soap without acidulation.

Fatty acids and soap content used in compositions of the present disclosure may derive from refined coconut oil known as MCT oil, or alternatively may be derived from palm oil or synthetic oils. MCT oil contains medium chain fatty acids, and may be utilized alone or in combination with other fatty acids, in the formulation of compositions of the present disclosure. MCT oil is a generally recognized as safe (GRAS) ingredient (United States FDA), and is an edible oil. MCT oil can be made into soap by saponification in which vegetable fatty acid of the soap and detergent properties are advantageously employed in compositions of the present disclosure. A typical composition of MCT oil is shown in Table A below

TABLE 1

MCT Oil Specification

| Parameter | Specification |
|---|---|
| Acid Value | 0.1 Max |
| Saponification Value | 325-345 |
| Moisture % | 0.15 Max |
| Fatty Acid Composition: | |
| C8 | 55-65 |
| C10 | 35-45 |

In like manner, coconut oil soap utilized in various compositions of the present disclosure may be made by saponification of coconut oil performed with potassium hydroxide (KOH) or other saponification agent according to the Saponification Value of Coconut Oil, with water used to create soap being at minimum 50% and at maximum 60%. The soap form may be acidulated with citric acid so that primarily $C_{12}$ fatty acid (lauric acid) is free, and preferably the acidulation is carried out so that additional $C_8$ and $C_{10}$ fatty acids are free. Alternatively, lauric acid and/or capric acid and/or caprylic acid can be added separately to the coconut oil soap without acidulation.

Coconut oil may be obtained by pressing and extraction of seeds of the coconut palm. Coconut oil is a generally recognized as safe (GRAS) ingredient (United States FDA), and is an edible oil. Coconut oil is a mixture of different fatty acids, the exact composition varies in dependency from the place of origin and the conditions during growth. A typical composition is shown in Table 2 below.

TABLE 2

Coconut Oil Specification
Saponification Value: 250-265

| Fatty Acid | Content (wt. %) |
|---|---|
| Capronic acid (C6) | 0.2-1.0 |
| Caprylic acid (C8) | 5.4-10.0 |
| Capric acid (C10) | 6.5-8.5 |
| Lauric acid (C12) | 45.0-55.0 |
| Myristic acid (C14) | 16.5-18.5 |
| Palmitic acid (C16) | 8.0-10.5 |
| Stearic acid (C18) | 2.0-2.8 |
| Oleic acid (C18:1) | 5.0-10.0 |
| Linolic acid (C18:2) | 0.7-1.9 |

Modified vegetable oil utilized in compositions of the present disclosure is advantageously methylated soybean oil. Alternatively, any vegetable oil feedstock may be employed, with preferred oil feedstocks having good solvency characteristics, remaining viscous through a practical range of temperature, e.g., 50° F.-110° F., and not solidifying in cooler weather. Canola oil is similar in fatty acid profile to soybean oil, and a preferred feedstock.

Methylation of the soybean oil enables the fatty acid content to act as a solvent and penetrant to woody stem plants with a high solvency KB (Kauri-butanol) value of 58, which is an excellent natural solvent. Soybean oil is a mixture of different fatty acids, whose exact composition varies dependent on the source of the soybeans from which the oil is derived. A typical soybean oil composition is set out in Table 3 below.

TABLE 3

| Fatty acid (number of carbon atoms:number of double bonds) | Content Wt. % (most common value) |
|---|---|
| C16:0 | 7.0-14 (10) |
| C18:0 | 1.4-4.5 (4.0) |
| C18:1 | 19-30 (21) |
| C18:2 | 44-62 (56) |
| C18:3 | 4-11 (8) |

In addition to the above-noted fatty acids, soybean oil comprises lesser amounts of fatty acids having 14 or fewer carbon atoms (less than 0.6 wt %), a small amount of $C_{16}$ fatty acids having one double bond (less than 0.5 wt %) as well as a low amount of fatty acids having 20 or 22 carbon atoms and 0 or 1 double bond, respectively (each less than 1.0 wt %).

Compositions of the present disclosure may also comprise fatty acid ester ingredients, such as vegetable methyl ester commercially available from Solvent Systems International as SSI Vegetable Methyl Ester.

Compositions of the present disclosure may be of varying forms, and may be a single phase soap composition, or alternatively an emulsion composition, in various embodiments. Emulsified forms of compositions of the present disclosure may be formulated using emulsifiers or emulsion-forming ingredients in any suitable manner, including those illustratively described elsewhere herein. Likewise, surfactants and surfactant builders may be employed in compositions of the present disclosure, as illustratively described elsewhere herein.

Compositions of the present disclosure may be prepared in the form of a concentrate that then is diluted by the end-user, or they may be provided as ready to use compositions to the user. The compositions of the present disclosure may utilize additional herbicidal and/or pest-control ingredient(s). Additional herbicidal ingredient(s) include other oils having herbicidal activity, e.g., cedarwood oil. In addition, formulations containing other herbicidal active(s) can be enhanced by using the vegetable fatty acid profiles and formulations and methods of the present disclosure.

The present disclosure further contemplates insecticidal and arthropod-repellent compositions, including (a) MCT soap and free fatty acids, optionally with modified vegetable oil(s).

The herbicidal compositions of the present disclosure provide safe and effective action in combating unwanted plants in areas containing or susceptible to emergence of same, and the compositions having herbicidal as well as pesticidal character likewise provide safe and effective action in combating unwanted plants as well as combating undesired pest species. The compositions of the present disclosure are readily formulated with natural ingredients, and have been found to have no adverse effect on bee and pollinator populations. In various formulations, the compositions of the present disclosure provide sustainable herbicidal and/or pesticidal action and may be formulated with recycled vegetable oil ingredients and other natural ingredients to provide vegetation control formulations, variously including selective as well as non-selective contact herbicides with a non-systemic mode of action.

Set out below are illustrative compositions of the present disclosure (Formula A through Formula M), as non-limiting examples of specific compositions in particular embodiments of the disclosure.

Formula A: 20% Soy Methyl Ester, 10% Capric Acid, 10% Capryllic Acid, 5% Lauric Acid, 3% Sodium Lauryl Sulfate (Standapol WAQ-LC, BASF CAS 68585-47-7), 0.3% Glycerol Monostearate, 0.3% Potassium Oleate, 0.4% Glycerin, and 51% Water Formula B: 5% Soy Methyl Ester, 4% Sodium Lauryl Sulfate (Standapol WAQ-LC, BASF CAS 68585-47-7), 2% Lauric Acid, 5% Glycerin, 4% Potassium Oleate, 3% Glycerol Monostearate, and 77% Water Formula C: 30% Soy Methyl Ester, 5% Capric Acid, 5% Caprylic Acid, 4% Sodium Lauryl Sulfate (Standapol WAQ-LC, BASF CAS 68585-47-7), 1% mark acid, 1% Peg40 Castor Oil, 0.9% Polysorbate 20, 0.2% Potassium Oleate, 0.3% Sodium Bicarbonate, 0.2% Glycerol Monostearate, 0.2% Citric Acid, 0.1% Glycerin, 0.1% Sodium Benzoate, and 52% Water Formula D: 47% Soy Methyl Ester, 47% $C_6, C_8, C_{10}, C_{12}$ fatty acid mixture (LC-810L, Peter Cremer CAS 67762-36-1), and 6% Sodium Lauryl Sulfate (Standapol WAQ-LC, BASF CAS 68585-47-7)

Formula E: 41% Soy Methyl Ester, 41% C6, C8, C 10, C 12 fatty acid mixture (LC-810L, Peter Cremer CAS 67762-36-1), 4.5% Sodium Lauryl Sulfate (Standapol WAQ-LC, BASF CAS 68585-47-7), 1% Glycerin, Enzymes (2.5% Pancreatic Amylase, 2.5% Fungal Lipase, 2.5% Cellulase, 2.5% Subtilisin (proteolytic enzyme), 2.5% Bacteria, Complex (with Amylase and Proteinase CAS 068920-42-3)

Formula F: From concentrate, 30% Modified Soy Oil, 22.5% C8, 17.5% C10, 4% C12, 6% SLS, 10% MCT SOAP diluted with water to 20% Concentrate for RTU. RTU: 6% Modified Soy Oil, 4.5% C8, 3.5% C10, 0.8% C12, 1.2% SLS, 2% MCT Soap, Water 82%

Formula G: From Concentrate, 30% Coconut Oil Soap, 10% Lauric Acid, 4% Glycerin, 3% GMS, 1% Citric Acid, 52% Water diluted with water to 10% Concentrate for RTU. RTU: 3% Coconut Oil Soap, 1% Lauric Acid, 0.4% Glycerin, 0.3% GMS, 0.1% Citric Acid, 95.2% Water Formula H: From Concentrate, 30% MCT Oil Soap, 4% Lauric Acid, 12% C8, 8% C10, 4% Glycerin, 3% GMS, 1% Citric Acid, 38% Water diluted with water to 25% Concentrate for RTU. RTU: 7.5% MCT Oil Soap, 1% Lauric Acid, 3% C8, 2% C10, 1% Glycerin, 0.75% GMS, 0.25% Citric Acid, 84.5% Water Formula I: From Concentrate, 70% Coconut Oil Soap, 8% Lauric Acid, 3% Glycerin, 10% Sodium Lauryl Sulfate, 7% water, and 2% Citric Acid diluted with water to 25% Concentrate for RTU. RTU: 17.5% Coconut Oil Soap, 2% Lauric Acid, 0.75% Glycerin, 2.5% Sodium Lauryl Sulfate, 0.5% Citric Acid, 76.75% Water Formula J: From Concentrate, 25% 'Modified Vegetable Oil', 55% Coconut Oil Soap, 7% Lauric Acid, 2% Glycerin, 10% Sodium Lauryl Sulfate, and 1% Citric Acid diluted with water to 50% Concentrate for RTU. RTU: 12.5% 'Modified Vegetable Oil', 27.5% Coconut Oil Soap, 3.5% Lauric Acid, 1% Glycerin, 5% Sodium Lauryl Sulfate, 0.5% Citric Acid, 50% Water Formula K: From Concentrate, 70% Coconut Oil Soap, 8% Lauric Acid, 3% Glycerin, 10% Cedarwood Oil, 7% water, and 2% Citric Acid diluted with water to 25% Concentrate for RTU. RTU: 17.5% Coconut Oil Soap, 2% Lauric Acid, 0.75% Glycerin, 2.5% Cedarwood Oil, 0.5% Citric Acid, 76.75% Water Formula L: From Concentrate, 25% 'Modified Vegetable Oil', 55% Coconut Oil Soap, 7% Lauric Acid, 2% Glycerin, 10% Cedarwood Oil, and 1% Citric Acid diluted with water to 50% Concentrate for RTU. RTU: 12.5% 'Modified Vegetable Oil', 27.5% Coconut Oil Soap, 3.5% Lauric Acid, 1% Glycerin, 5% Cedarwood Oil, 0.5% Citric Acid, 50% Water Formula M: From Concentrate, 25% 'Modified Vegetable Oil', 42% MCT Oil Soap, 6% C8, 4% C10, 10% Sodium Lauryl Sulfate, 2% Glycerin, 10% Geraniol Oil, and 1% Citric Acid diluted with water to 50% Concentrate for RTU. RTU: 12.5% 'Modified Vegetable Oil', 21% MCT Oil Soap, 3% C8 Fatty Acid, 2% C10 Fatty Acid, 5% Sodium Lauryl Sulfate, 1% Glycerin, 5% Geraniol Oil, 0.5% Citric Acid, 50% Water The results for use of Formula F, Formula G, and Formula H in specific target vegetation herbicidal applications, and the selectivity/non-selectivity character of such compositions in these applications, are set out in Table 4 below.

TABLE 4

| Composition Formula | Target Vegetation Type | Selective/non-selective | Results |
| --- | --- | --- | --- |
| F | Woody Stem Trees, Weeds, Grasses, Ivy (poison ivy, Kudzu) | Non-Selective | Total Vegetation Kill - can kill trees based on contact of entire tree - after 1 year area trees sprayed are still dead but new growth of other species are growing. Kills some grasses, ie. fescue and suppresses others, ie. Bermuda. Kills ivy including poison ivy, Kudzu |
| G | Small weeds <4 inch in agriculture field | Selective | Does not affect grass; kills broad leaf weeds and Small Briars less than 4" |
| H | Weeds, ivy, and small woody stem plants | Selective | Kills most weeds, ivy and small woody stem plants but not bushes or trees. Burns down grass but does not kill it. |

Pesticidal compositions of the present disclosure can be formulated from natural ingredients that are effective but also have a non-systemic mode of action as a contact insecticide and a biodegradable character providing beneficial buildup of soil and maintenance of habitats that are safe for humans and animals. As contact insecticides with a desiccant mode of action, insecticidal compositions of the present disclosure ensure that insects and arthropods will not build up resistance to them, and such compositions can be selectively used to avoid cidal action on beneficial insects.

The compositions of the present disclosure are readily biodegradable and break down into nutrients and organic matter constituting a food source for beneficial soil organisms. Their formulation with natural vegetable oils deriving from agricultural crops is sustainable, since they are recycled back to the environment without harmful effects.

Selective herbicidal compositions of the present disclosure, utilizing coconut oil insecticidal soap with free fatty acids, are advantageous for yard and crop sprays, as cidal contact agents for controlling insects and arthropods by a desiccant mode of action. As with herbicidal compositions of the present disclosure, insecticidal compositions in accordance with the present disclosure can be formulated to utilize the free fatty acid content and profile of a soap or detergent by adding fatty acids to the soap or detergent content (e.g., SLS, coconut oil soap, MCT soap) or saponifying coconut oil soap or MCT soap and acidulating the soap forms for the free fatty acid content described herein.

For cidal action, insects or arthropods must fully contact the pesticidal composition. Accordingly, bees and other pollinators are not affected by landing on the material, and in fact are observed to avoid it until it breaks down. Being readily biodegradable, the insecticidal composition quickly breaks down so that it is not harmful.

Pesticidal compositions of the present disclosure display enhanced insect and arthropod penetration and cidal effectiveness at higher dilutions with water, to reliably control insects and arthropods. The free fatty acid composition of the insecticidal soap can be optimized to yield immediate quick kill results in application to a wide range of insects and arthropods, including hard bodied insects and arthropods.

The pesticidal compositions of the present disclosure achieve enhanced results by detergent or soap action dissolving the waxes and protein structures of insect and arthropod exoskeletons, allowing the specific free fatty acid components to penetrate into the exoskeleton and further break down the structure rapidly, causing the insight to quickly dehydrate and respiratory systems to cease as a result of disruption of cell membrane integrity.

For control of hard bodied insects and arthropods, pesticidal compositions of the present disclosure are advantageously formulated so that soap and/or detergent with the specified fatty acid components along with the modified vegetable oil effect penetration of the outer cuticle structure. The specified fatty acid components are benign with respect to human and animal health and habitats.

Thus, selective herbicidal compositions for insect and arthropod control can be formulated, which do not kill grass and are selective for broad leaf and/or other weed species. The Formula G composition is particularly effective on insects, killing mosquitoes, aphids, fleas, and other small insects. The Formula I composition containing SLS as a detergent component, together with coconut oil soap and free fatty acid components, is particularly effective on ticks and for controlling hard bodied arthropods. Since these compositions do not have a systemic mode of action and full contact of material is needed to kill an insect or arthropod past, these compositions will not negatively affect beehives or pollinator colonies when bees or other pollinators land on them. Further, these compositions are readily biodegradable and break down quickly into ground nutrients and food sources for microbes, thereby enhancing the soil and enriching pollinator habitats. The Formula I composition has been observed to immediately kill outdoor cockroaches, fire ants, flies, wasps, ticks, spiders, stinkbugs, Japanese beetles, and carpenter bees.

Adding modified vegetable oil to coconut oil soap with free fatty acids and to detergent, e.g., SLS, compositions, increases cidal and repellent effectiveness by enhancing penetration and weatherproofing for extended insect and arthropod control duration. The Formula J composition, in addition to being cidal to insects and arthropods, is also repellent to cockroaches and other arthropods and they seek to avoid contact. This composition is also more weatherproofing and persisting in character, and lasts for 2 weeks as a deer repellent when sprayed on outside vegetation. The Formula J composition is also highly effective in controlling flies on equine and bovine animal species for 2 weeks after spraying the animals when the animals are out of doors for the entire 2 week period.

Preferred organic compositions of the present disclosure can be made in certified organic formulas by adding organic oils having cidal or repellent character for arthropod control. A particularly effective organic composition is the Formula K composition containing cedarwood oil that is cidal to insects and arthropods and can be used in yards and on structures. The Formula L composition, of similar formulation to the Formula K formulation but containing modified seed oil, is more weatherproof and lasts 2 weeks as a deer repellent when sprayed on outside vegetation. The Formula L composition also effectively controlled flies on dogs, equine, and bovine animal species for 2 weeks after spraying the animals when the animals are out of doors for the entire 2 week period. Repellency was also observed after spraying outside wood structures and residential wood decking, killing cockroaches, spiders, and carpenter bees on full contact, and repelling insects and arthropods for 30 days.

Another preferred composition for livestock insecticide application and arthropod control on structures is the Formula M composition, using SLS and MCT oil soap and specific fatty acids, and such composition may be employed for arthropod control on plant species for which the composition is herbicidal.

The Formula M composition is preferred as a highly effective general pest control composition for killing insects and vegetation, or to control insects and arthropods on animals. The Formula M composition is particularly useful in mulch areas and will control weeds, grasses, insects, and arthropods for more than 30 days.

Table 5 below identifies specific control results for insecticidal and arthropod control compositions of Formulas G, I, J, K, L, and M.

TABLE 5

| Insect, Arthropod, Pest Control Compositions | | | |
|---|---|---|---|
| COMPOSITION FORMULA | Pest, Insect or Arthropod | Animal, Area, or Structure | Control Results |
| G = Coconut oil Soap + fatty acids | Mosquito, Aphids, Thrips, Spider mites, Fleas, common Ant | Garden | Immediate Kill of target Insects (<1 minute) |
| I = SLS + Coconut oil Soap + fatty acids | Fly, cockroach, Lone Star Tick, Spider, Fire | Yard and fruit Trees, Garden, On | Quick Kill (<5 min) of target arthropods |

TABLE 5-continued

Insect, Arthropod, Pest Control Compositions

| COMPOSITION FORMULA | Pest, Insect or Arthropod | Animal, Area, or Structure | Control Results |
|---|---|---|---|
| | Ant, Japanese Beetle, Carpenter Bee, Squash Beetle, Stink Bug, Grasshopper, Wasp | Playground Wood Structure | |
| J = Coconut oil Soap + fatty acids + Modified Vegetable Oil | Fly, Flea, Horse Fly, Lone Star Ticks, Japanese Beetle, Carpenter Bee, Stink Bug, Wasp, Mosquito, Aphid, Spider mites, Fleas, Fire Ant, Deer | Yard, Dog, Horse and Cow | Immediate kill insects, Quick Kill Arthropods and Repellent to Arthropods on yard for 2 weeks. Repelled Deer from vegetation for 2 weeks. |
| K = SLS + Coconut oil Soap + fatty acids + Cedarwood Oil | Fly, flea, Aphid, Spider Mite, Thrip, Ticks, Japanese Beetle, Squash Beetle, Stink Bug, Grasshopper | Organic farm areas and Organic Livestock | Immediately killed Insects; Arthropods killed in 10 minutes |
| L = Coconut oil Soap + fatty acids + Cedar Oil + Modified Vegetable oil | Fly, flea, Japanese Beetle, Lone Star Tick, Grasshopper, Cockroach, Spider, Carpenter Bee | Yard, Garden, Wood Structures, Dog, Horse, and Cow | Immediate kill of insects, Quick kill of arthropods, Repelled Arthropods from Yard for 2 weeks, Repelled Arthropods for 30 days from wood structures, repelled Deer from Vegetation for 2 weeks. Repelled Arthropods for 2 weeks on Dog, Horse and Cow. |
| M = SLS + MCT Oil Soap + FA + Geraniol + Modified Veg Oil | Grass and Weeds, Mosquito, Fly, Flea, Japanese Beetle, Lone Star Tick, Grasshopper, Cockroach, Spider, Carpenter Bee, Fire Ants, Common Ants, Wasp | Yard mulch areas, Wood Home Structures, Wood Playground Structure, Stone walkway, Gravel Area | Immediate kill of insects and arthropods on Contact. Controlled Weeds and Insects and Arthropods from walkways and wood structures and mulched areas for 30 days. Controlled arthropods for 30 days on animals. |

It will be appreciated that the compositions of the present disclosure may be formulated in any of suitable forms, including concentrate forms, intermediate diluted forms, and final diluted ready to use forms. The choice of a specific form will depend on the specific ingredients, proportions of water and other solvent media in the final use form of the composition, and other processing, packaging, and transportation considerations.

In specific embodiments, the herbicidal composition of the present disclosure may comprise a concentrate comprising (i) soy methyl ester, (ii) sodium laurel sulfate, and (iii) $C_6$-$C_{12}$ fatty acid(s), e.g., $C_8$ and/or $C_{10}$ and/or $C_{12}$ fatty acid(s).

In various embodiments, the herbicidal composition concentrate may consist, or consist essentially of, the ingredients (i)-(iii).

The herbicidal composition concentrate may be prepared for use, i.e., administration to a locus containing or susceptible to emergence of unwanted vegetation such as grasses, woody brush, trees, and weeds, by addition to the concentrate, comprising ingredients (i)-(iii), of a (iv) diluent, to form a diluted herbicidal formulation. The diluent may be of any suitable type that is effective for dissolution or suspension of the concentrate ingredients. The diluent may for example comprise an aqueous medium such as water or an alcoholic aqueous solution, a silicone, oil, or any other appropriate diluent. Water is a preferred diluent.

In addition to the ingredients (i)-(iii) in the herbicidal composition concentrate, and the ingredients (i)-(iv) in the diluted herbicidal formulation, other excipients and ingredients may optionally be employed in either the concentrate or the diluted formulation, such as emulsifiers, defoamers, surfactants, stabilizers, pH modifiers, preservatives, etc. Emulsifiers may be of any suitable type, and may include, for example, one or more of potassium oleate, Peg40 castor oil, polysorbate 20, lecithin, and other emulsifying agents. Defoamers may include glycerol monostearate, potassium oleate, or other suitable deforming agents. Surfactants and stabilizers may be of any suitable types. Suitable pH modifiers include sodium bicarbonate, potassium bicarbonate, and other base and acid materials. Preservatives that may be employed in various embodiments include citric acid, sodium benzoate, and other preservative agents. Where enzymes are included in the composition, glycerin may be added as an enzyme protectant.

In the concentrate, and in the diluted formulation, the compositions of the disclosure may utilize the ingredients (i)-(iii) in any suitable proportions in relation to one another, and in the diluted formulation, the proportion of (iv) water or other diluent may be substantially varied.

In various embodiments, the herbicidal composition concentrate may contain (i) soy methyl ester in an amount in a range of from 45 to 50% by weight, (ii) sodium laurel sulfate in an amount of from 4 to 8% by weight, and (iii) from 45 to 50% by weight of $C_6$-$C_{12}$ fatty acid(s), e.g., $C_6$ and/or $C_8$ and/or $C_{10}$ and/or $C_{12}$ fatty acid(s), based on the total weight of such ingredients (i), (ii), and (iii), wherein the amounts of all such ingredients (i), (ii), and (iii) total to 100 weight percent. In various embodiments, as herein earlier indicated, the herbicidal composition concentrate may comprise, consist, or consist essentially of, such ingredients (i), (ii), and (iii). In any of such embodiments, the concentrate may incorporate emulsifiers, surfactants, stabilizers, pH modifiers, preservatives, etc.

In other embodiments, the herbicidal composition concentrate may contain (i) soy methyl ester in an amount in a range of from 46 to 48% by weight, (ii) sodium laurel sulfate in an amount of from 5 to 8% by weight, and (iii) from 46 to 48% by weight of $C_8$ and/or $C_{10}$ and/or $C_{12}$ fatty acid(s), based on the total weight of such ingredients (i), (ii), and (iii), wherein the amounts of all such ingredients (i), (ii), and (iii) total to 100 weight percent.

In various embodiments of the diluted herbicidal formulation, the concentration of the (iv) diluent may be in a range of from 1 to 98% by weight, based on the total weight of the ingredients (i), (ii), (iii), and (iv), wherein the amounts of all such ingredients (i), (ii), (iii), and (iv) total to 100 weight percent. In other embodiments, the concentration of the (iv) diluent may be in a range of from 5 to 95% by weight, or from 10 to 95% by weight, or from 15% to 85% by weight, or in other range, on the same total weight basis, wherein the amounts of all ingredients (i), (ii), (iii), and (iv) total to 100 weight percent.

In various embodiments, the herbicidal composition concentrate may contain a small amount of diluent, in relation to the amount of diluent that is subsequently added to the concentrate to form the diluted herbicidal formulation.

Set out in Table 6 below is a listing of the ingredients and amounts thereof in one illustrative embodiment of the herbicidal composition concentrate, as well as an illustrative range of amounts of such ingredients and the diluent in the diluted herbicidal formulation.

diluent medium, as may be appropriate for use in a specific application with specific spray equipment. The herbicidal composition concentrate has been found to be useful for selective weed control in amounts of from 1 to 4 gallons per 3 acres with 50 gallons of water as the diluent in the applied diluted herbicidal formulation applied to such weed-containing acreage.

In addition to spraying application, the herbicidal compositions of the present disclosure may be administered to specific ground areas, specific plants, or other loci containing or subject to emergence of undesired vegetation. This may include delivery of the composition to a specific locus by drip irrigation, misting, nebulization, direct liquid application, or any other delivery technique which is effective to bring the herbicidal composition in contact with the unwanted vegetation so that it is cidally effective for such vegetation.

In other specific applications, the herbicidal composition concentrate may be used at full strength without (water) dilution, or alternatively with water dilution of 4 ounces of concentrate per gallon of water, to effectively kill undesired vegetation such as grasses, woody brush, trees, and weeds. In applications in which the weeds comprise Bermuda grass and/or the unwanted vegetation comprises woody brush, diluted herbicidal formulations of 16 ounces of the herbicidal composition concentrate per gallon of water may be employed to effect total vegetation kill of such weeds and woody brush, although higher dilutions may be employed to achieve longer periods of vegetation control.

The concentrate compositions and diluted formulations of the disclosure are highly effective when applied to grasses, woody brush, trees, or weeds to be killed in a location containing same, where the location receives 2 hours or more of daylight, and are particularly cidally effective when applied prior to rain, at temperatures above 76° F. or otherwise at or above the temperature at which the specific vegetation (weeds, woody brush, trees, and grasses) conduct photosynthesis.

In various embodiments, the use of additional ingredients such as potassium oleate and glycerol in the aqueous (e.g., water) diluent assists in maintaining stability of the active ingredients in the diluted formulation in which the active ingredients and additional ingredients may be emulsified,

TABLE 6

| | INGREDIENT | Herbicidal Composition Concentrate Containing Ingredients (i), (ii), and (iii) (Weight percent based on total weight of concentrate) | Diluted Herbicidal Formulation (Weight percent based on total weight of formulation) |
|---|---|---|---|
| (i) | Soy Methyl Ester | 47% | 1% to 60% |
| (ii) | Sodium Lauryl Sulfate (Standapol WAQ-LC, BASF CAS 68585-47-7) | 6% | 0.1% to 20% |
| (iii) | $C_8$ and/or $C_{10}$ and/or $C_{12}$ Fatty Acid | 47% | 1% to 60% |
| (iv) | Diluent (e.g., water) | none | 0 to 97.9% |
| Other ingredients (emulsifiers, surfactants, stabilizers, pH modifiers, preservatives, etc.) | | any of such ingredients may optionally be present | any of such ingredients may optionally be present |

The herbicidal composition concentrate may thus be diluted with water or other diluent to constitute the herbicidal formulation for use as a contact herbicide, penetrating herbicide, and/or selective herbicide. In various embodiments, the herbicidal composition concentrate may contain emulsifiers and/or surfactants for dispersal in water or other and is particularly useful for formulations for selective control of unwanted vegetation, e.g., weed(s), woody brush, tree(s), etc. For use as an aquatic herbicide, compositions of the present disclosure may further include enzymes that are cidally effective against pond algae as well as pond plants, weeds, woody brush, trees, and grasses. Such enzymes may be of any suitable type, appropriate to the particular end use of the composition, and may for example include any one or more of amylase, cellulase, keratinase, lifinase, lipase, pectinase, protease, xylanase, and other enzymes.

Compositions of the present disclosure may be formulated to be selective against woody brush and trees but not other vegetation, e.g., in locations in which it is important to keep existing grass but to remove such woody brush and trees. The composition may thus be applied so that grasses will respond by burning back but thereafter grow back at the treated location, while the woody brush and trees at such location are killed.

Woody brush and trees as referred to herein encompass woody stem plants and trees, and they sometimes are referred to in the aggregate as woody plants. Woody plants, by definition, are plants that have hard stems, thus the term, "woody", as compared, for example, to "herbaceous" plants. Trees, which are further characterized as deciduous and evergreen plants, are woody plants.

The compositions of the present disclosure are readily made by blending of ingredients under mixing conditions.

In compositions containing fatty acid(s), soy methyl ester, and sodium lauryl sulfate, the fatty acid(s) are advantageously blended with the soy methyl ester first and the resulting material blend then is added to the sodium lauryl sulfate under mixing conditions, e.g., sodium lauryl sulfate in a small amount of water or other suitable diluent under high shear mixing. Other diluents may be used, such as silicone or oils or alcohols. When the concentrate is formed without any diluent, foaming may result. To minimize such foaming behavior, the concentrate may be constituted with any of suitable emulsifiers, defoamers, stabilizers, etc., such as lecithin, polysorbate 20, potassium oleate, glycerol monostearate, and glycerin, being blended together under high shear mixing with a water-based diluent to form a stabilized emulsion. Such composition is formulated so that it is appropriate for use in the specific application, and so that the composition satisfies the viscosity and other requirements of the spray equipment or other application devices that are utilized to administer the composition to the locus in which weeds, woody brush, trees, and grasses are to be eliminated. In various specific implementations, preservatives, fragrances, pH modifiers, and other ingredients may also be added to the composition.

Vegetation that may be controlled using the herbicidal compositions of the present disclosure include, without limitation: (a) woody plants, including, without limitation, *Acacia*, Alder, Arrowwood, Aspen, Dogwood, Oaks, Thistleberry, Douglas fir, Osage Orange, Tree-of-Heaven (*Ailanthus*), Ash, Elderberry, Pepper Vine, Trumpet Creeper, Elm, Persimmon, Tulip Poplar, Bear Clover (Bearmat), Gallberry, Persimmon, Beech, Gorse, Pine, Virginia Creeper, Birch, Granjeno, Poison Ivy, Wax Myrtle, Blackberry, Guajillo, Poison Oak, Wild Rose, Blackbrush, Guava, Poplar, Willow, Black gum, Hawthorn, Salmonberry, Winged elm, Boxelder, Hazel, Saltbush (*Braccharis* spp), Brazilian Pepper, Hickory, Saltbush (silver myrtle), Buckthorn, Hornbeam, Salt Cedar, Cascara, Huisache (suppression), Sassafras, Ceanothus, Kudzu, Scotch Broom, Cherry, Locust, Sumac, Chinquapin, Madrone, Sweetbay, Magnolia, Choke Cherry, Maples, Sweet Gum, Cottonwood, Milkweed Vine, Sycamore, Crataegus (hawthorn), Mulberry, and Tan Oak; (b) weeds, including, without limitation, Black Medic, Curly dock, Matchweed, Sulfur Cinquefoil, Bull Thistle, Dandelion, Mustard, Sweet Clover, Burdock, Dogfennel, Oxalis, Tropical Soda Apple, Canada Thistle, Field Bindweed, Plantain, Vetch, Chicory, Goldenrod, Purple Loosestrife, Wild Carrot (Queen Anne's Lace), Cinquefoil, Ground Ivy, Ragweed, Wild Lettuce, Clover, Lambs quarters, Sericea Lespedeza, Wild Violet, Creeping Beggarweed, Lespedeza, Smartweed, and Yarrow; (c) grasses, including, without limitation, graminoids species including Poaceae (also called Gramineae), sedges (Cyperaceae), and rushes (Juncaceae) including, by common names, Bermuda, Rye, Bluegrass, Fescue, Kikuyu, crabgrass, centipede, Saint Augustine, Bahia, Johnson Grass, and Marsh grasses; (d) woody brush weeds and plants, including annual weeds such as Annual Broomweed (*Amphiachyris dracunculoides*), Bitter sneezeweed/Basin sneezeweed (*Helenium amarum*), Buffalobur (*Solanum rostratum*), Bur buttercup (*Ranunculus testiculates*), Camphorweed (*Heterotheca subaxillaris*), Common Cocklebur (*Xanthium strumarium*), Horseweed (*Marestail*) (*Conyza Canadensis*), Lambs quarters—Common (*Chenopodium album*), Marshelder (*Iva annua*), Pigweed—Redroot (*Amaranthus retroflexus*), Ragweed—Common (*Ambrosia artemisiifolia*), Ragweed—Giant (*Ambrosia trifida*), Ragweed—Lanceleaf (Southern) (*Ambrosia bidentata*), Smartweed—Pennsylvania (*Polygonum pennsylvanicum*), Sunflower—Common (*Helianthus annua*), Western Bitterweed (*Hymenoxys odorata*), Woolly Croton (Goatweed, Doveweed) (flowers inconspicuous, usually clustered at branch tips; seeds smooth, somewhat turtle-shaped), and Yellow Starthistle (*Centaurea solstitialis*); (e) biennials/perennials, including, without limitation, Absinth Wormwood (*Artemisia absinthium*), Blue Vervain (*Verbena hastate*), Broom Snakeweed (*Gutierrezia sarothrae*), Chicory (*Cichorium intybus*), Curly Dock (*Rumex crispus*), Curly Dock Gumweed (*Grindelia squarrosa*), Dalmatian Toadflax (*Linaria genistifolia*), Dandelion (*Taraxacum officinale*), Dogfennel (*Eupatorium capillifolium*), Field Bindweed (*Convolvulus arvensis*), Fringed (Prairie) Sagewort (*Artemisia frigida*), Goldenrod (*Solidago*), Hairy Goldenaster (*Heterotheca villosa*), Ironweed (Western) (*Vernonia baldwinii*), Knapweed—Diffuse (*Centaurea diffuse*), Knapweed—Russian (*Acroptilon repens*), Knapweed—Spotted (*Centaurea Stoebe*), Larkspur—Geyer (*Delphinim Geyeri*), Larkspur—Plains (*Delphinim virescens*), Larkspur—Tall (*Delphinim exaltatum*), Locoweed (Lambert and Silky Crazyweed) (*Oxytroplis sericea*), Milkweed (*Asclepias* spp), Mullein—Common (*Verbascum thapsus*), Orange Hawkweed (*Hieracium aurantiacum*), Oxeye Daisy (*Leucanthemum vulgare*), Prairie Wild Rose (*Rosa arkansana*), Pricklypear Cactus (*Opuntia polyacantha*), Ragweed—Bur (*Ambrosia grayi*), Ragweed—Western (*Ambrosia psilostachya*), Rush Skeletonweed (*Chondrilla juncea*), Sericea Lespedeza (*Lespedeza cuneata*), Silverleaf Nightshade (*Solanum elaeagnifoilum*), Spiny Aster (Mexican Devil-Weed; Wolf Weed) (*Chloracantha spinosa*), Spurge—Leafy (*Euphorbia esula* L. Perennial), St. Johnswort (*Hypericum perforatum*), Sulfur cinquefoil (*Potentilla recta*), Tansy—Common (*Tanacetum vulgare*), Thistle—Bull (*Cirsium vlugare*), Thistle—Canada (*Cirsium arvense*), Thistle—Musk (*Carduus nutans*), Thistle—Plumeless (*Carduus acanthoides*), Thistle—Scotch (*Onopordum acanthium*), Wild Carrot (*Daucus carota*), Wild Licorice (*Glycyrrhiza lepidota*), Yankee weed (Rosin Weed) (*Eupatorium compositifolium*), and Yellow Toadflax (*Linaria vlugaris*); (e) woody plants/brush, including, without limitation: Blackberry (Rosaceae family), Blackbrush (Rosaceae family), Bluewood (Brazil) (Rhamnaceae family), Buckbrush (Rhamnaceae family), Catclaw *Acacia* (Fabaceae family), Cenizo (Melastomataceae family), Chinese Tallowtree (Euphorbiaceae family), Chokecherry, Creosotebush (Zygophyllaceae family), Eastern Cottonwood (Salicaceae family), Eastern Persimmon (Ebenaceae family), Eastern Redcedar (Cupressaceae family), Green Ash (Oleaceae family), Guajillo (Fabaceae family), Hawthorn (Rosaceae family), Hedge (Bois d'Arc, Osage Orange) (Moraceae family), Hickory—Bitternut (Juglandaceae family), Hickory—Black (Juglandaceae family), Honey Locust (Fabaceae family), Huisache, Juniper—Blueberry (Ashe) (Cupressaceae family), Juniper—Redberry (Cupressaceae family), Live Oak (Fagaceae family), Lotebush (Rhamnaceae family), Louisiana Wormwood (Artemisia ludoviciana), Macartney Rose (Rosaceae family), Mesquite—Honey (glandulosa) (Fabaceae family), Mesquite—Western Honey (torreyana) (Fabaceae family), Multiflora Rose (Rosaceae family), Oak—Blackjack (Fagaceae family), Oak—Poison (Anacardiaceae family), Oak—Post (Fagaceae family), Oak—Sand Shinnery (Fagaceae family), Pinyon Pine (Pinaceae family), *Picea rubens* (red spruce), *Pinus clausa* (sand pine), *Pinus echinata* (shortleaf pine), *Pinus elliottii* (slash pine), *Pinus palustris* (longleaf pine), *Pinus pungens* (Table Mountain pine), *Pinus rigida* (pitch pine), *Pinus strobus* (eastern white pine), *Pinus taeda* (loblolly pine), *Pinus virginiana* (Virginia pine), Poison Ivy (Anacardiaceae family), Prairie Wild Rose (Rosaceae family), Prickly Ash (Rutaceae family), Privet (Oleaceae family), Rabbitbrush (Douglas) (Asteraceae family), Red Mulberry (Moraceae family), Running Live Oak (Fagaceae family), Russian Olive (Elaeagnaceae family), Sagebrush (Asteraceae family), Saltcedar (Tamaricaceae family), Sand Sage (Asteraceae family), Shagbark Hickory (Juglandaceae family), Siberian Elm (Ulmaceae family), Skunkbrush (Anacardiaceae family), Smooth Sumac (Anacardiaceae family), Spiny Hackberry (Granjeno) (Ulmaceae family), Sweetgum (Hamamelidaceae family), Texas Persimmon (Ebenaceae family), Twisted *Acacia* (Fabaceae family), Western Snowberry (Caprifoliaceae family), Wild Plum (Rosaceae family), Willow *Baccharis* (Asteraceae family), Winged Elm (Ulmaceae family), and Yaupon (Aquifoliaceae family).

Compositions of the present disclosure have the further advantage in application to ground areas or other loci containing unwanted vegetation that they are pesticidal to pests such as fire ants, so that such pests can be removed from the loci containing unwanted vegetation contemporaneously with the herbicidal treatment of the unwanted vegetation.

Compositions of the present disclosure display insect and arthropod repellency characteristics, and may be usefully applied to human skin, clothing, and animals to provide protection from insects and arthropods.

The features and advantages of the disclosure are more fully shown with regard to the following illustrative examples, wherein all parts and percentages are by weight, unless otherwise expressly stated.

EXAMPLE 1

A selective herbicidal composition concentrate, Formula A, was prepared, comprising the ingredients in the amounts set out below.

Formula A: Selective Herbicide Concentrate Formula

| | |
|---|---|
| Soy Methyl Ester | 20.0% |
| Capric Acid | 10.0% |
| Capryllic Acid | 10.0% |
| Lauric Acid | 5.0% |
| Sodium Lauryl Sulfate, (Standapol WAQ-LC, BASF CAS 68585-47-7) | 3.0% |

-continued

| | |
|---|---|
| Glycerol Monostearate | 0.3% |
| Potassium Oleate | 0.3% |
| Glycerin | 0.4% |
| Water | 51.0% |

A trial of the diluted herbicidal formulation based on Formula A was then conducted, as described below.

Trial with Selective Herbicidal Formulation (Formula A Concentrate Diluted at a Ratio of 2 Gallons Formula A Concentrate/50 Gallons Water)

Two gallons of the selective herbicide concentrate of Formula A were mixed with 50 gallons of water into a 55 gallon tractor sprayer with sprayers extended to each side to cover ground to the width of the tractor with consistent spray. Temperature at the time of application was 91° F. with partly cloudy sky. Spraying of 3 acres using the entire 52 gallons of mix was completed at 11:30 AM. Within 4 hours, the Greenbrier and sowthistle, spiny weeds were browning and tops turning over. Within one week, the briers and thistle weeds were dead and the grass was green and continued to grow healthy.

Trial with Selective Herbicidal Formulation (Formula A Concentrate Diluted at a Ratio of 2 Gallons Formula A Concentrate/28 Gallons Water Two gallons of selective herbicide concentrate of Formula A were mixed with 28 gallons of water into a 55 gallon tractor sprayer with sprayers extended to each side to cover the ground to the width of the tractor with consistent spray. Temperature was 91° F. with partly cloudy sky. Spraying of 1.5 acres using the entire 30 gallons of mix was completed by 11:30 AM. Within 1 day, the briers, thistles, dogfennel, horseweed, ragweed, ironweed, horsenettle and prickly burweed were burned down and within 3 days they were dead. The grass was burned down slightly within 1 day but was green by 1 week and continued to grow.

EXAMPLE 2

A natural selective herbicidal composition of a ready to use formulation, Formula B, was prepared, comprising the ingredients in the amounts set out below.

Formula B: Natural Selective Herbicide Ready to Use Formula

| | |
|---|---|
| Soy Methyl Ester | 5.0% |
| Sodium Lauryl Sulfate, (Standapol WAQ-LC, BASF CAS 68585-47-7) | 4.0% |
| Lauric Acid | 2.0% |
| Glycerin | 5.0% |
| Potassium Oleate | 4.0% |
| Glycerol Monostearate | 3.0% |
| Water | 77.0% |

One gallon of the selective herbicide of Formula B was sprayed directly on an area with briars, thistles and fescue grass and shrubs and trees. Temperature was 91° F. Within 1 day, the briars and thistles started to discolor and by 1 week they were dead. There was no difference seen in the other vegetation and the grasses and other vegetation stayed green and thriving.

EXAMPLE 3

A total vegetation kill herbicidal composition with rainproof characteristics, Formula C, was prepared, comprising the ingredients in the amounts set out below.

Formula C: Total Vegetation Kill with Rainproof Characteristics, Ready To Use Formula

| | |
|---|---|
| Soy Methyl Ester | 30.0% |
| Capric Acid | 5.0% |
| Capryllic Acid | 5.0% |
| Sodium Lauryl Sulfate, (Standapol WAQ-LC, BASF CAS 68585-47-7) | 4.0% |
| Lauric Acid | 1.0% |
| Peg40 Castor Oil | 1.0% |
| Polysorbate 20 | 0.9% |
| Potassium Oleate | 0.2% |
| Sodium Bicarbonate | 0.3% |
| Glycerol Monostearate | 0.2% |
| Citric Acid | 0.2% |
| Glycerin | 0.1% |
| Sodium Benzoate | 0.1% |
| Water | 52.0% |

Three gallons of Formula C in a backpack sprayer were directly applied on Johnson grass, fescue grass, crabgrass, woody bush and tree. Temperature was 87° F. and overcast with rain 30 minutes after spraying was completed. The rain lasted for 30 minutes, and the remainder of the day was overcast. The following day was overcast, with intense rain storms lasting more than 4 hours, however, the sprayed vegetation was dark in color. The vegetation areas that had been sprayed continued to die over the next two days, and no regrowth was seen for 14 days when the treated area was last monitored.

EXAMPLE 4

A natural vegetation kill herbicidal concentrate composition, Formula D, was prepared, comprising the ingredients in the amounts set out below.

Formula D: Natural Vegetation Kill Concentrate (Kills Grass at 8 oz/Gallon Water Dilution and Woody Brush at 16 oz/Gallon Water Dilution)

| | |
|---|---|
| Soy Methyl Ester | 47.0% |
| $C_6$, $C_8$, $C_{10}$, $C_{12}$ fatty acid mixture, (LC-810L, Peter Cremer CAS 67762-36-1) | 47.0% |
| Sodium Lauryl Sulfate, (Standapol WAQ-LC, BASF CAS 68585-47-7) | 6.0% |

Grass Trial with 8 oz Formula D Concentrate Diluted with Water to 1 Gallon Total Using a hand-held pump-up sprayer, a 100 square foot section of crabgrass was wetted with 25 oz of the diluted mixture. In addition, a 100 square feet section of Bermuda grass was wetted consistently with 50 oz of the diluted mixture. Brown-in was observed within 1 hour and total kill in 1 day for both grass sections. There was no regrowth within 14 days.

Woody Brush Area with 16 oz Formula D Concentrate Diluted with Water to 1 Gallon Ratio The woody brush area contained wild blackberry briers, greenbriers, thistles, bushes, small trees, grasses, and weeds and vines, specifically including blackberry (*Rubus pensilvanicu*), musk thistle (*Carduus nutans* L.), poison ivy (*Toxicodendron radicans*), honeysuckle (*Lonicera japonica*), autumn olive (*Elaeagnus umbellate*), pokeberry (*Phytolacca* sp), sweet gum (*Liquidambar styraciflua*), pine tree (*Pinus palustris*), Johnson grass (*Sorghum halepense*), tree of heaven (*Ailanthus altissima*), Japanese stilt grass (*Microstegium vimineum*), ragweed (*Ambrosia*), and Greenbrier (*Smilax rotundifolia* L). A hilly area of 2000 square feet was sprayed using 4 gallons of diluted product (64 oz of Formula D concentrate to 448 oz of water) in a hand-held pump-up sprayer, and vegetation was wetted with 4 gallons of the diluted mixture. The product was applied at 5 PM with little sun and temperature of 88° F. After 15 hours, on the next morning, significant brown-in was observed throughout all the vegetation and by 24 hours total kill was observed. There was no regrowth within 28 days.

EXAMPLE 5

A natural aquatic herbicidal composition, Formula E, was prepared, comprising the ingredients in the amounts set out below.

Formula E: Natural Aquatic Herbicide Test In and Around Pond

| | |
|---|---|
| Soy Methyl Ester | 41.0% |
| $C_6$, $C_8$, $C_{10}$, $C_{12}$ fatty acid mixture, (LC-810L, Peter Cremer CAS 67762-36-1) | 41.0% |
| Sodium Lauryl Sulfate, (Standapol WAQ-LC, BASF CAS 68585-47-7) | 4.5% |
| Glycerin | 1% |
| Enzymes: | |
| Pancreatic Amylase | 2.5% |
| Lipase, Fungal | 2.5% |
| Cellulase | 2.5% |
| Subtilisin (proteolytic enzyme) | 2.5% |
| Bacteria, Complex (with Amylase and Proteinase CAS 068920-42-3) | 2.5% |

One gallon of Formula E was broadcasted toward the center of a pond with a heavy algae growth covering the top of the ½ acre pond. 1.5 gallons of Formula E was sprayed with a pump-up hand-sprayer around the pond on pond weeds, grasses, tree saplings (including 4 feet pine trees and 3 feet cedar trees, among other varieties of bushes and trees at the edge of the pond). All vegetation was dead in 1 day. The algae turned white in one day and started dropping to the bottom of the pond in 2 days. In one week, the algae was cleared and no regrowth of vegetation occurred around the pond. There was no evidence of fish, birds or frogs killed, and fish, birds and frogs continued to inhabit the pond.

The efficacy of the herbicidal compositions of the present disclosure are shown with reference to the accompanying figures hereof.

FIG. 1 is a photograph of a woody brush area, prior to any treatment.

Figure 2:
FIG. 2 is a photograph of the woody brush area of FIG. 1, one day after treatment of such area with a herbicidal composition of the present disclosure.

FIG. 2 is a photograph of the woody brush area of FIG. 1, one day after treatment of such area with a herbicidal composition of the present disclosure.

Figure 3:
FIG. 3 is a photograph of the woody brush area of FIG. 1, one week after treatment of such area with a herbicidal composition of the present disclosure.

FIG. 3 is a photograph of the woody brush area of FIG. 1, one week after treatment of such area with a herbicidal composition of the present disclosure.

Figure 4:
FIG. 4 is a photograph of a woody tree, prior to any treatment.

FIG. 4 is a photograph of a woody tree, prior to any treatment.

Figure 5:
FIG. 5 is a photograph of the woody tree of FIG. 4, one day after treatment of such tree with a herbicidal composition of the present disclosure.

FIG. 5 is a photograph of the woody tree of FIG. 4, one day after treatment of such tree with a herbicidal composition of the present disclosure.

Figure 6:
FIG. 6 is a photograph of the woody tree of FIG. 4, one week after treatment of such tree with a herbicidal composition of the present disclosure.

FIG. 6 is a photograph of the woody tree of FIG. 4, one week after treatment of such tree with a herbicidal composition of the present disclosure.

Figure 7:
FIG. 7 is a photograph of Johnson grass, prior to any treatment.

FIG. 7 is a photograph of Johnson grass, prior to any treatment.

Figure 8:
FIG. 8 is a photograph of the Johnson grass of FIG. 7, one day after treatment with a herbicidal composition of the present disclosure.

FIG. 8 is a photograph of the Johnson grass of FIG. 7, one day after treatment with a herbicidal composition of the present disclosure.

Figure 9:
FIG. 9 is a photograph of the Johnson grass of FIG. 7, one week after treatment with a herbicidal composition of the present disclosure.

FIG. 9 is a photograph of the Johnson grass of FIG. 7, one week after treatment with a herbicidal composition of the present disclosure.

Figure 10:
FIG. 10 is a photograph of crabgrass, prior to any treatment.

FIG. 10 is a photograph of crabgrass, prior to any treatment.

Figure 11:
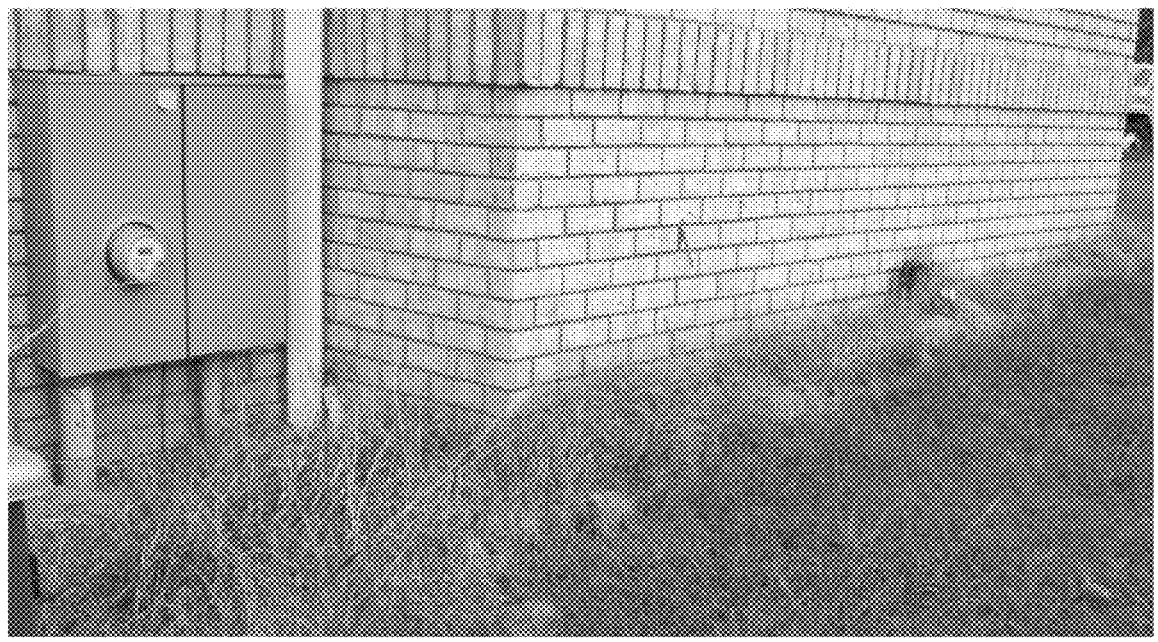
FIG. 11 is a photograph of the crabgrass shown in FIG. 10, one day after treatment with a herbicidal composition of the present disclosure.

FIG. 11 is a photograph of the crabgrass shown in FIG. 10, one day after treatment with a herbicidal composition of the present disclosure.

Figure 12:
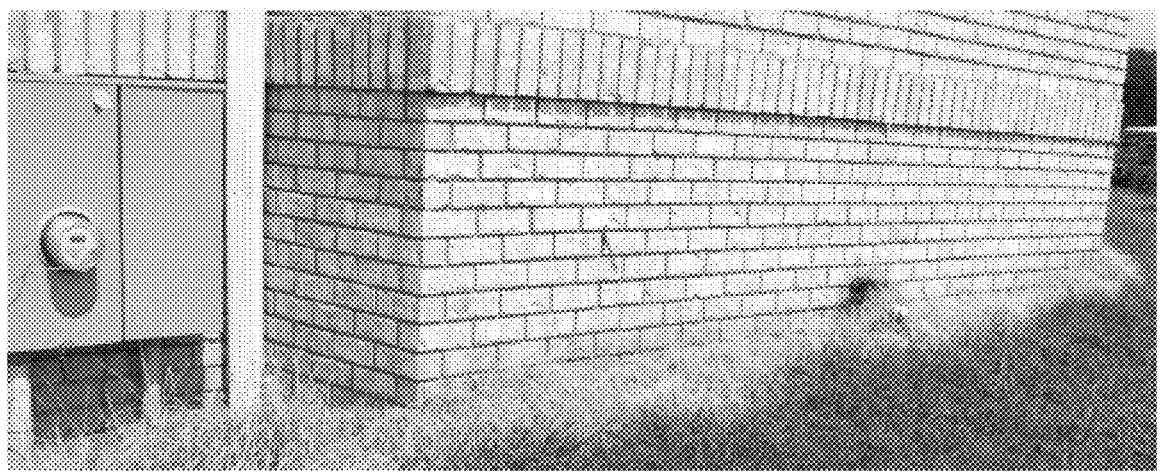
FIG. 12 is a photograph of the crabgrass shown in FIG. 10, one week after treatment with a herbicidal composition of the present disclosure.

FIG. 12 is a photograph of the crabgrass shown in FIG. 10, one week after treatment with a herbicidal composition of the present disclosure.

Figure 13:
FIG. 13 is a photograph of thistle weed, prior to any treatment.

FIG. 13 is a photograph of thistle weed, prior to any treatment.

Figure 14:
FIG. 14 is a photograph of the thistle weed shown in FIG. 13, one day after treatment with a herbicidal composition of the present disclosure.

FIG. 14 is a photograph of the thistle weed shown in FIG. 13, one day after treatment with a herbicidal composition of the present disclosure.

Figure 15:
FIG. 15 is a photograph of the thistle weed shown in FIG. 13, one week after treatment with a herbicidal composition of the present disclosure.
Figure 16:
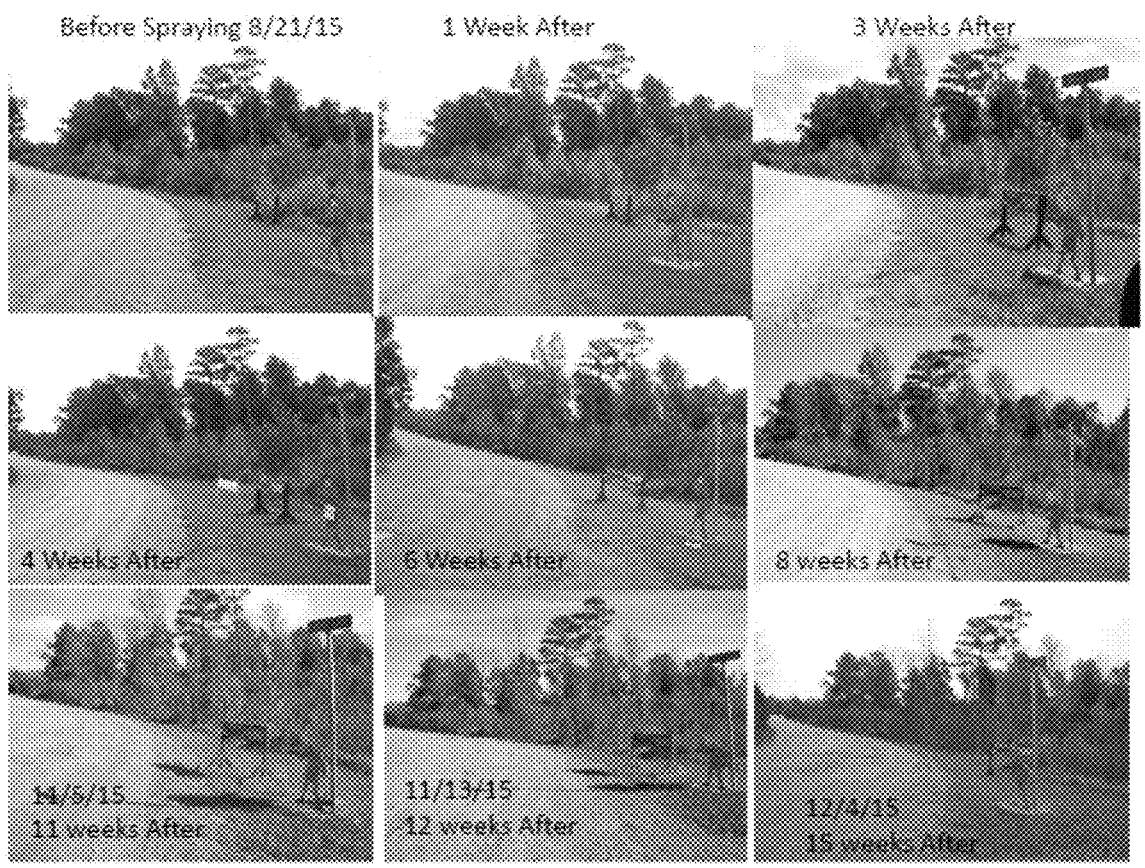
FIGS. 16-24 are compiled photographs illustrating the treatment of various target vegetation with the Formula F composition of the disclosure, as applied with a 100 gallons per application spray wand applicator.
Figure 17:
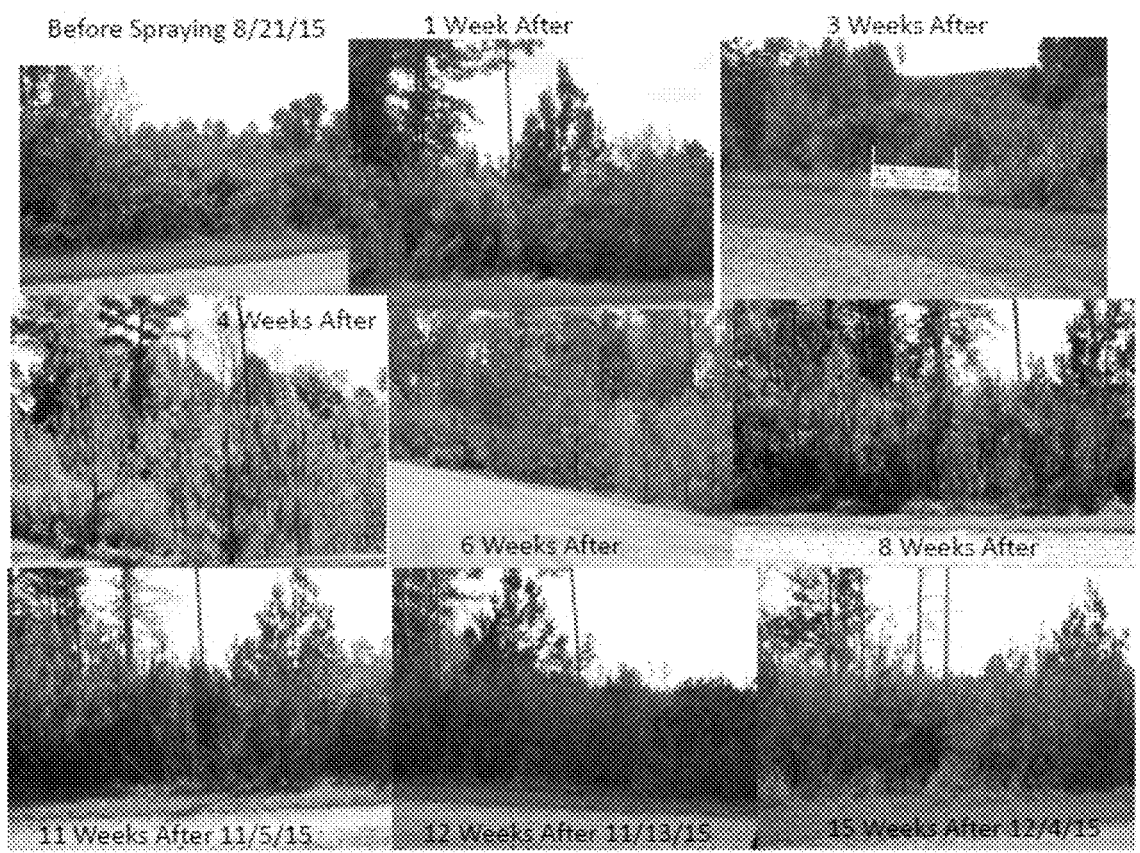
Figure 18:
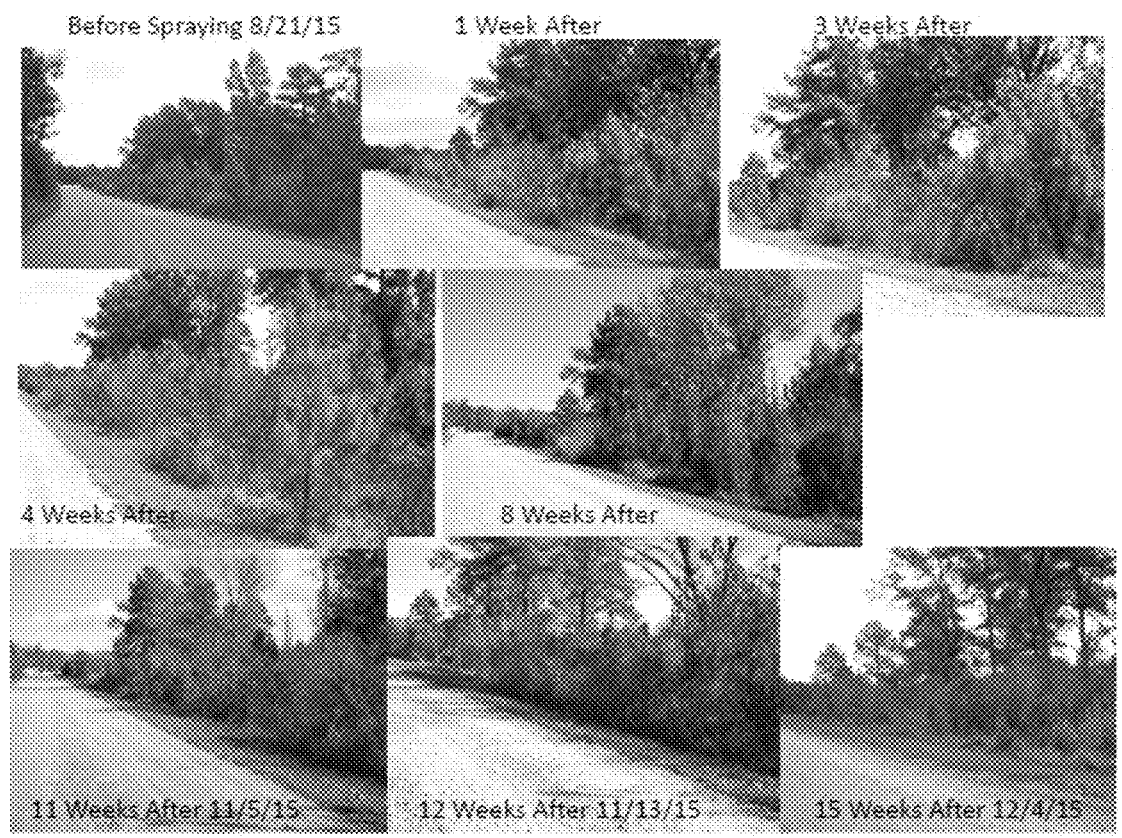
Figure 19:
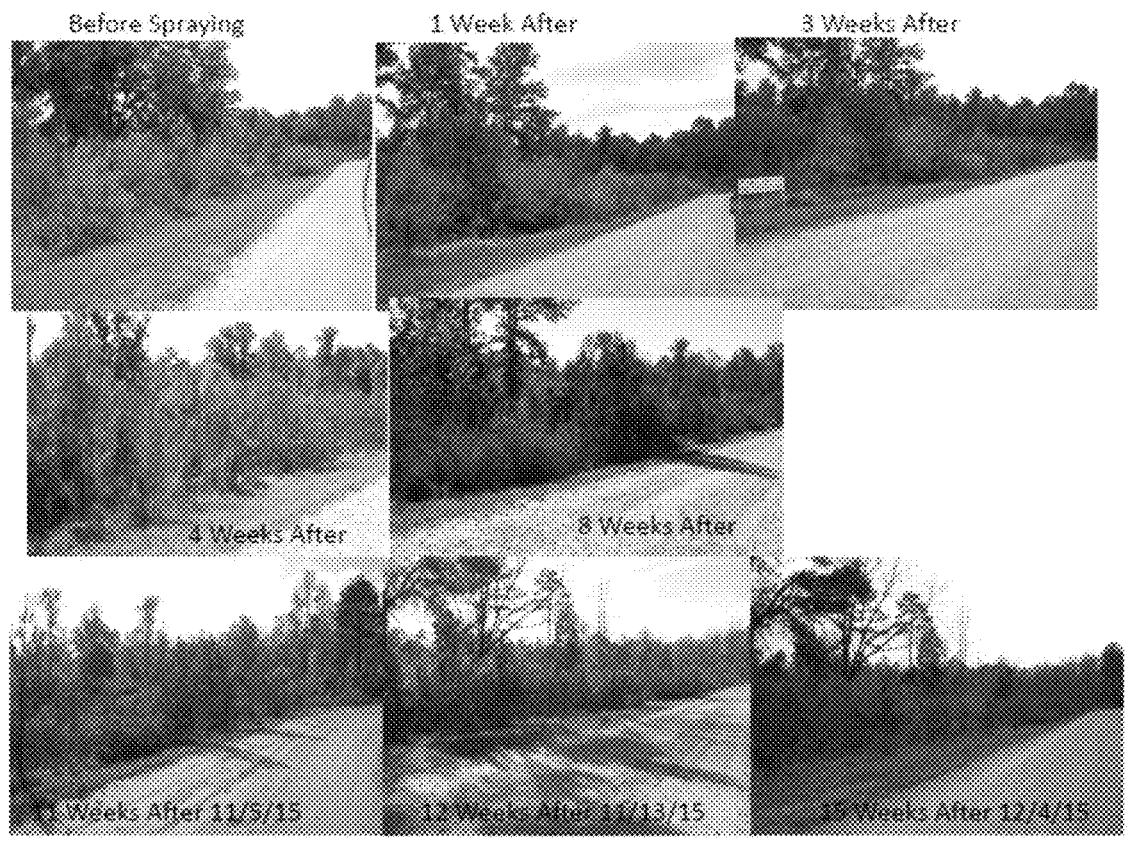
Figure 20:
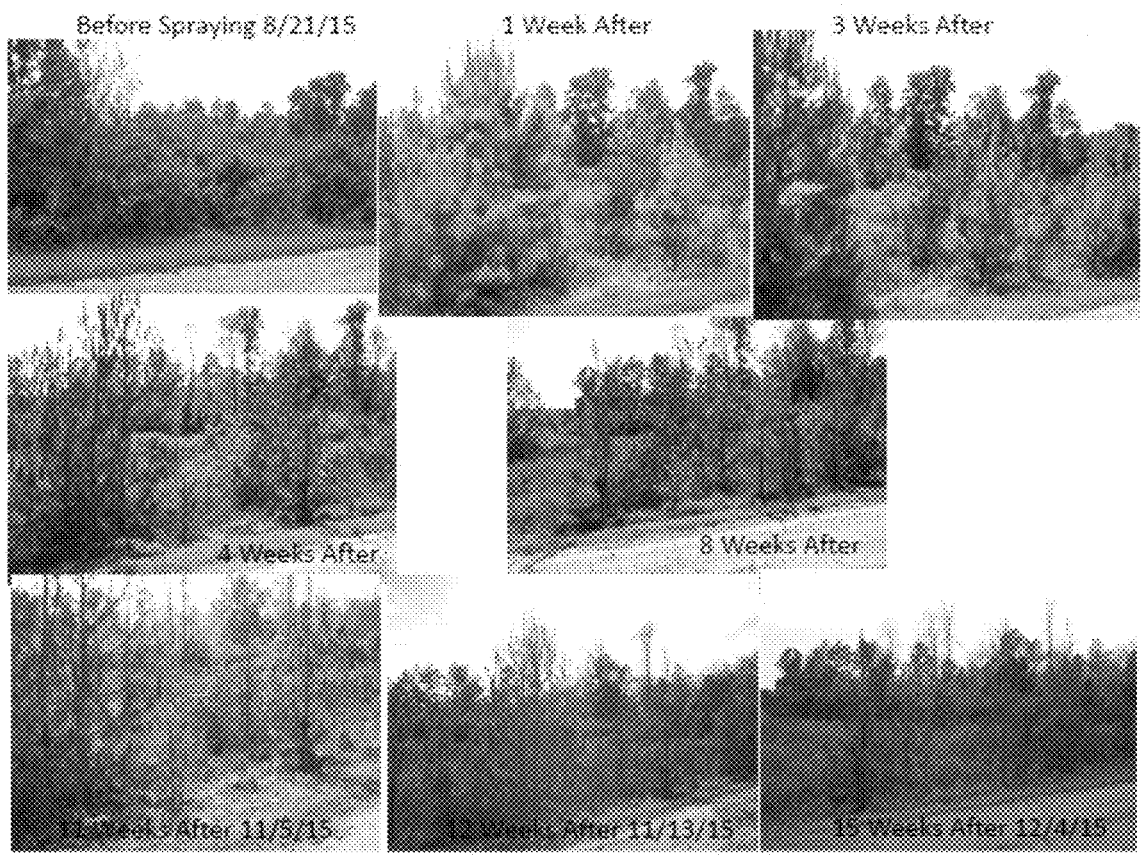
Figure 21:
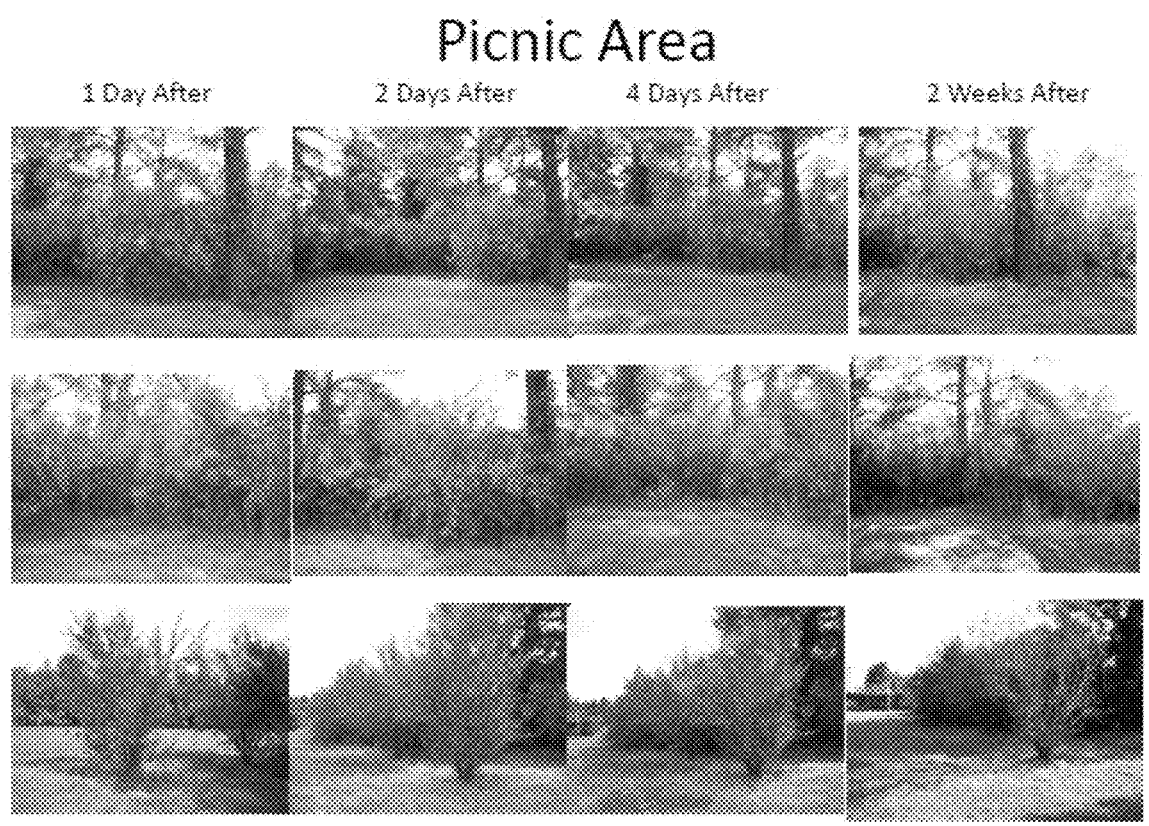
Figure 22:
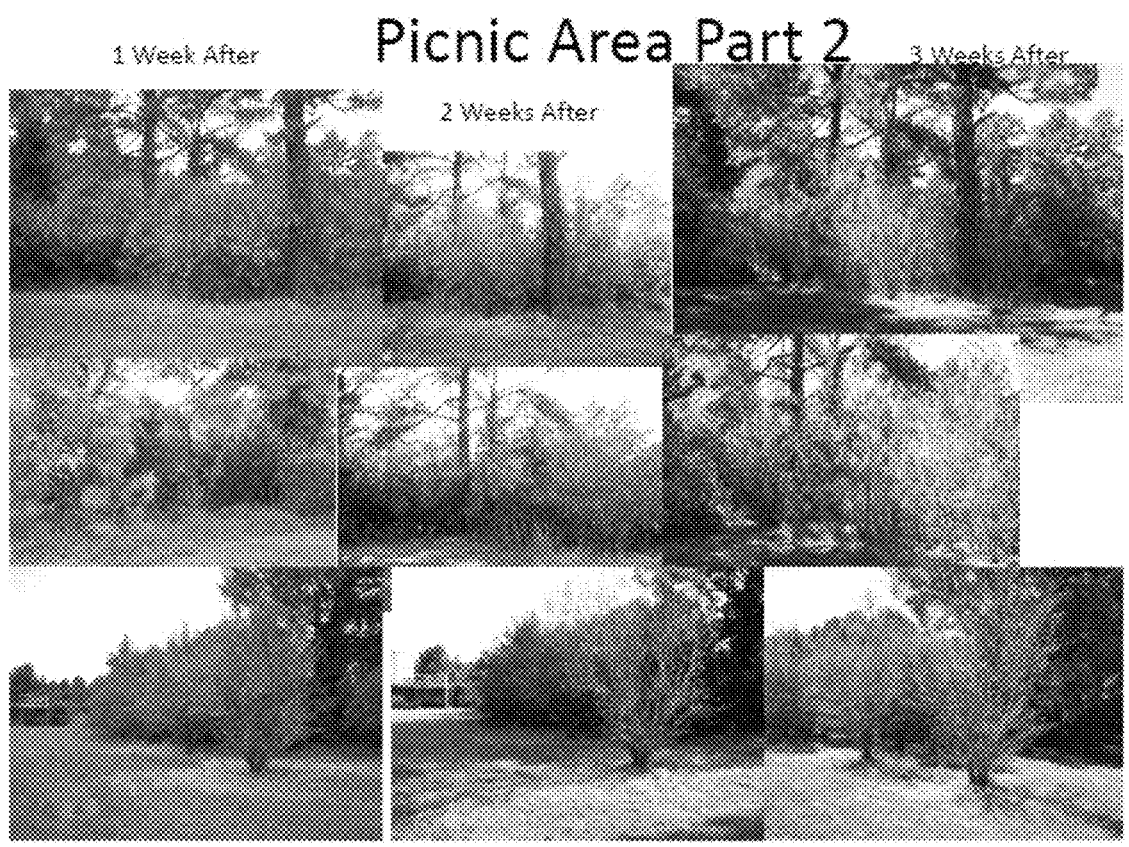
Figure 23:
Figure 24:
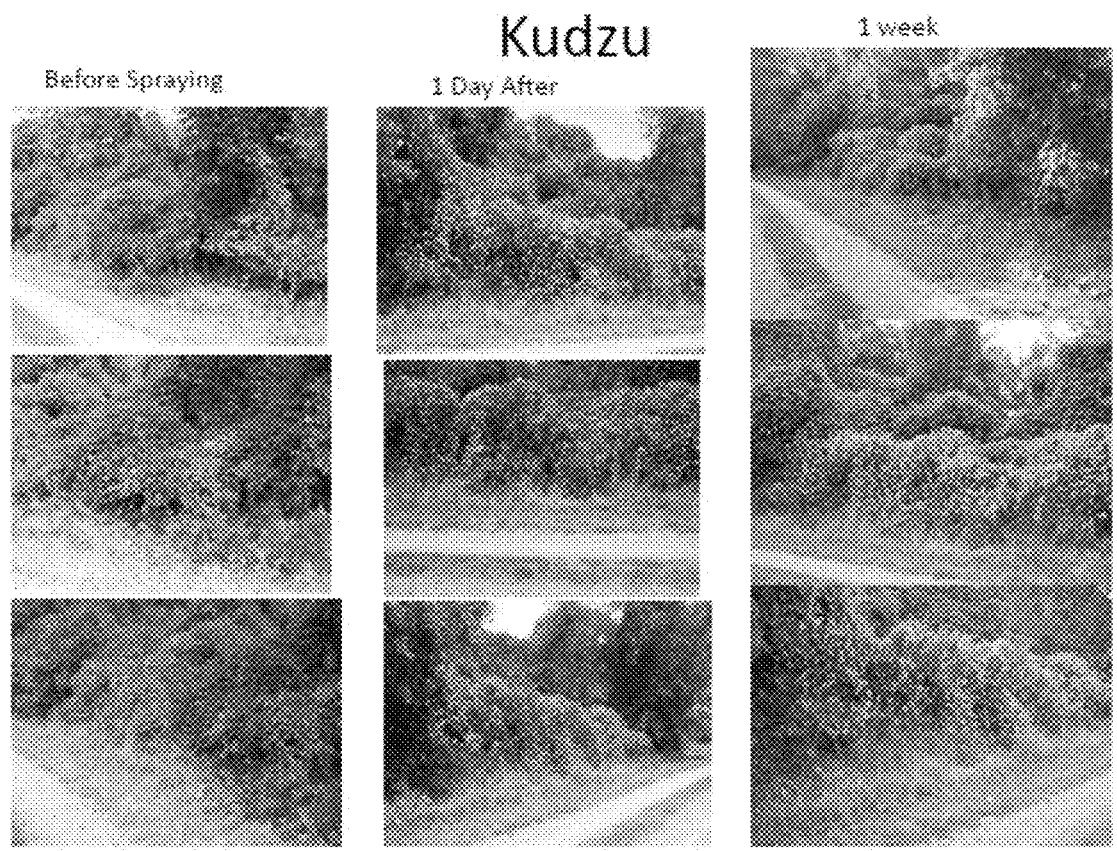

FIG. 15 is a photograph of the thistle weed shown in FIG. 13, one week after treatment with a herbicidal composition of the present disclosure.

FIGS. 16-24 are compiled photographs illustrating the treatment of various target vegetation with the Formula F composition of the disclosure, as applied with a 100 gallons per application spray wand applicator.

Figure 25:
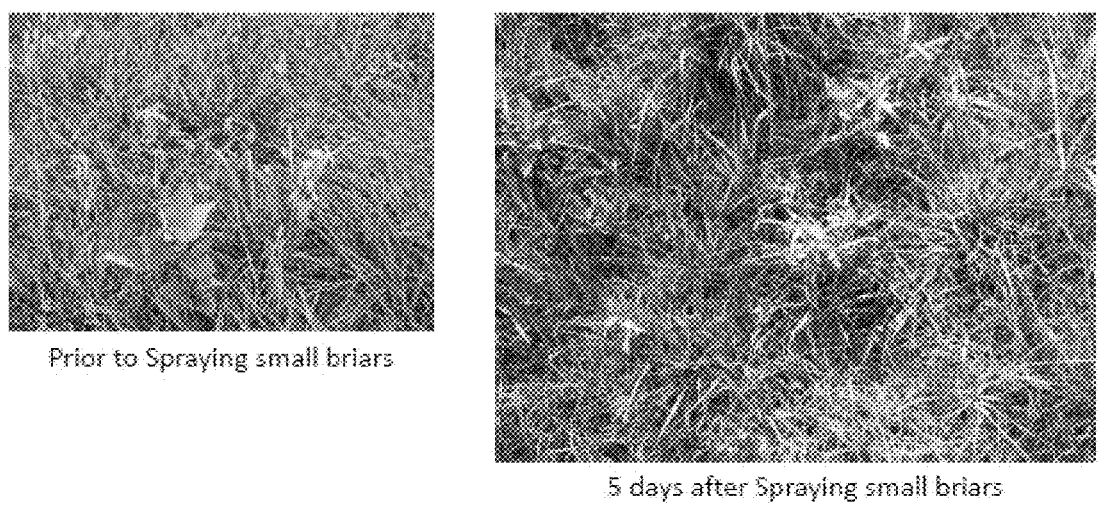
FIG. 25 is a composite of before and after photographs illustrating the treatment of small briars with the Formulation G composition of the disclosure.

FIG. 25 is a composite of before and after photographs illustrating the treatment of small briars with the Formulation G composition of the disclosure.

Figure 26:
FIG. 26 is a composite of before and after photographs illustrating the treatment of large briars, ivy, and weeds with the Formulation H composition of the disclosure.
Figure 26:

FIG. 26 is a composite of before and after photographs illustrating the treatment of large briars, ivy, and weeds with the Formulation H composition of the disclosure.

Figure 27:
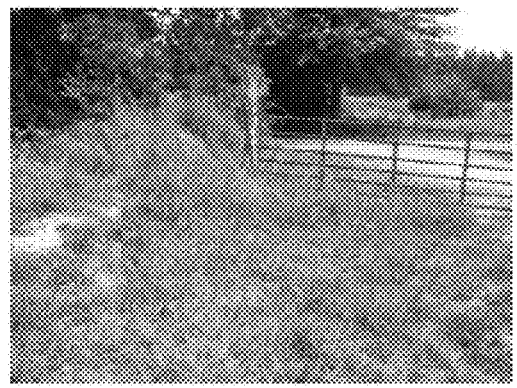
FIG. 27 is a composite of before and after photographs illustrating the treatment of grass with the Formulation H composition of the disclosure.
Figure 27:

FIG. 27 is a composite of before and after photographs illustrating the treatment of grass with the Formulation H composition of the disclosure.

As used herein, the term "MCT oil-based soap" refers to soap formed from medium chain triglyceride (MCT) oil, which optionally has been processed by pH modulation and/or acidulation to yield free fatty acids. The MCT oil that is utilized to form the MCT oil-based soap has a fatty acid composition in which the $C_8$ (caprylic acid) and $C_{10}$ (capric acid) fatty acids constitute at least 75 weight percent of the total weight of the oil and may constitute 100% of the total weight of the oil, or the $C_8$ and $C_{10}$ fatty acids may constitute at least 80%, 85%, 90%, 95%, 97%, 98%, 99% and 99.5% of the total weight of the oil, wherein any of the aforementioned weight percent values may constitute a weight percent range bounded by lower and higher values selected from the foregoing weight percentages, on the same total weight of the oil basis.

The MCT oil that is utilized to form the MCT oil-based soap may in some embodiments also contain any one or more of $C_6$, $C_9$, and $C_{12}$ fatty acids subject to the requirements discussed in the preceding paragraph for the amount of $C_8$ and $C_{10}$ fatty acids in the MCT oil.

An MCT oil that has been advantageously utilized for forming MCT oil-based soap for herbicidal compositions of the present disclosure is MCT (medium chain triglyceride) oil, commercially available from J. Edwards International, Inc. having a fatty acid composition of 2% caproic acid ($C_6$ fatty acid), 65% caprylic acid ($C_8$ fatty acid), 45% capric acid ($C_{10}$ fatty acid) and 3% lauric acid ($C_{12}$ fatty acid), having a saponification value in a range of from 325 to 345 mg KOH/gm.

The present disclosure in various embodiments contemplates herbicidal compositions and pest-control compositions comprising coconut oil soap containing $C_6$, $C_8$, $C_{10}$, and $C_{12}$ fatty acids, in which the total amount of $C_8$ and $C_{10}$ fatty acids together may be less than in the MCT oil utilized to form the MCT oil-based soap, e.g., from 25 weight percent to less than 75 weight percent, based on total weight of the coconut oil soap. The coconut oil soap may be utilized in herbicidal compositions of the present disclosure, in combination with MCT oil-based soap.

In various pest-control compositions of the present disclosure, coconut oil soap may be used as an active insecticidal or insect repellent agent, and may be utilized in combination with MCT oil-based soap.

The MCT oil-based soap and the coconut oil soap when present in compositions of the present disclosure may be formed by pH modification and/or acidulation with suitable acid such as for example citric acid or acetic acid, answer processing may be carried out to form free fatty acids of appropriate carbon numbers and relative amounts in relation to one another. Alternatively, specific fatty acids can be added to the soap stock directly to provide a desired free fatty acid content of various desired fatty acid species.

Preferably, pH modification and/or acidulation is achieved by citric acid or acetic acid in an amount that is in a range of from 15% to 40% of the oil content by weight of the soap. For example, a dilute aqueous solution of acetic acid, e.g., containing 5-10% acetic acid, can be utilized for pH modification and/or acidulation.

The coconut oil soap when utilized in compositions of the present disclosure may be of any suitable type and may for example comprise potassium cocoate soap formed from a suitable soap stock such as coconut oil or MCT oil.

In various embodiments, the present disclosure contemplates limonene-free herbicidal compositions, and more particularly, d-limonene-free herbicidal compositions. It recently has been shown that the d-isomer of limonene causes male rat-specific kidney toxicity (hyaline droplet nephropathy), with chronic exposure causing a significant incidence of renal tubular tumors in male rats, raising concern regarding its human safety and risk of, in addition to established human physiological side effects of normal sensitization, and irritated and bronchoconstrictive airway effects. Further, d-limonene is flammable as a liquid and a vapor, and is toxic to aquatic life. For such reasons, it may be desirable in some applications to provide compositions of the present disclosure that are free of limonene content therein, or that more specifically are free of d-limonene content therein. In other applications, the compositions may advantageously contain limonene, or more specifically may advantageously contain d-limonene.

Relative to the use of MCT oil-based soap and/or coconut oil soap, as well as fatty acids, in compositions of the present disclosure, it is to be noted that such ingredients are employed in the compositions of the present disclosure as active ingredients. Thus, the use of soaps as active ingredients in the compositions of the present disclosure is in opposition to the prevailing wisdom of the art, which has regarded soaps as inert ingredients, e.g., in the United States Environmental Protection Agency's "Inert Ingredients Eligible for FIFRA 25 (b) Pesticide Products," revised November, 2016, https://www epa.gov/sites/production/files/2016-11/documents/minrisk_inert_ingredients_w_tolerances_2016-11-16.pdf, wherein soaps, as well as fatty acids, are identified as inert ingredients.

In one fundamental aspect, the present disclosure provides an herbicidal composition comprising MCT oil-based soap.

Such herbicidal composition in various embodiments may further comprise free fatty acids including at least $C_8$ and $C_{10}$ free fatty acids; for example, the herbicidal composition may comprise: from 2 weight percent to 50 weight percent $C_8$ free fatty acid; from 2 weight percent to 50 weight percent $C_{10}$ free fatty acid; and from 0 weight percent to 8 weight percent $C_{12}$ free fatty acid, based on the total weight of the $C_8$ free fatty acid, the $C_{10}$ free fatty acid, and the $C_{12}$ free fatty acid, and wherein the weight percentages of the $C_8$ free fatty acid, the $C_{10}$ free fatty acid, and the $C_{12}$ free fatty acid total to 100 weight percent. In various embodiments, the herbicidal composition may be constituted, wherein $C_8$ free fatty acid and $C_{10}$ free fatty acid together comprise from 5 weight percent to 100 weight percent of the free fatty acids in the herbicidal composition. In other embodiments of the herbicidal composition, the composition may contain from 5 to 95 weight percent MCT oil-based soap, based on total weight of the herbicidal composition.

The herbicidal composition as variously described above may comprise MCT-based soap that is derived from coconut oil and/or from any other sources, such as palm oil, canola oil, etc. The herbicidal composition as variously described above may comprise coconut oil soap containing $C_6$, $C_8$, $C_{10}$, and $C_{12}$ fatty acids. The herbicidal composition as variously described above may comprise from 1 to 60 weight percent of coconut oil soap, based on total weight of the herbicidal composition.

Herbicidal compositions of the present disclosure, as variously described above, may have a pH in a range of from 3 to 5.

Herbicidal compositions of the present disclosure, as variously described above, may comprise free fatty acids that have been formed by pH modification and/or acidulation of the MCT oil-based soap. Additionally, or alternatively, herbicidal compositions of the present disclosure, as variously described above, may comprise fatty acids that are non-derived from the MCT oil-based soap.

More generally, any of the herbicidal compositions of the present disclosure, as variously described herein, may comprise one or more ingredients selected from the group consisting of acetic acid, soybean oil, soy methyl ester, citric acid, water, emulsifier, essential oils, preservatives, glycerin, and sodium bicarbonate. In various embodiments, the herbicidal compositions may explicitly exclude any one or more of such ingredients, as may be necessary or desirable in a given application of the herbicidal composition.

In specific embodiments, the herbicidal composition may comprise the MCT oil-based soap, $C_8$ and $C_{10}$ free fatty acids, and citric acid, optionally with coconut oil soap containing $C_6$, $C_8$, $C_{10}$, and $C_{12}$ fatty acids, and optionally with one or more of soybean oil, soy methyl ester, water, and emulsifier. The emulsifier when present may be of any suitable type, and may comprise, for example, glycerol monostearate, palmitic acid, sodium lauryl sulfate, or other emulsifier species or combinations of different emulsifier species. In general, sodium lauryl sulfate is a preferred emulsifier. Such herbicidal composition may for example be formulated with from 0 to 60% by weight of the coconut oil soap, with $C_8$, $C_{10}$, and $C_{12}$ free fatty acids, wherein the $C_8$ free fatty acid may constitute from 2 to 50% by weight of the total free fatty acids, the $C_{10}$ fatty acid may constitute from 2 to 50% by weight of the total free fatty acids, and the $C_{12}$ free fatty acid may constitute from 0 to 8% by weight of the total $C_8$, $C_{10}$, and $C_{12}$ free fatty acids, wherein the soybean oil may constitute from 0 to 20% by weight, the soy methyl ester may constitute from 0 to 40% by weight, citric acid may constitute 5 to 35% by weight, water may constitute from 0 to 50 weight percent, and emulsifier may constitute from 0 to 10% by weight, wherein all weight percents are based on total weight of the composition, and wherein all weight percents total to 100 weight percent. The herbicidal compositions of this paragraph may be utilized in various herbicidal applications and/or in algicidal applications, and such compositions also have pest control character, and thus provide various multifunctional applications.

In other embodiments, the herbicidal composition may comprise the MCT oil-based soap containing $C_8$ and $C_{10}$ fatty acids, free fatty acids comprising 2%-20% by weight capric acid, 2%-20% by weight caprylic acid, and 0-8% by weight of lauric acid, optionally with one or more of coconut oil soap containing $C_6$, $C_8$, $C_{10}$, and $C_{12}$ fatty acids, in the amount of 0-10% by weight, soybean oil in the amount of 0-20% by weight, soy methyl ester in the amount of 0-40% by weight, water in the amount of 0-80% by weight, emulsifier (e.g., sodium lauryl sulfate in the amount of 0-10% by weight, glycerol monostearate in the amount of 0-8% by weight, or palmitic acid in the amount of 0-2% by weight), glycerin in the amount of 0-8% by weight, and preservatives in the amount of 0-2% by weight, wherein all weight percents are based on total weight of the composition, and wherein all weight percents total to 100 weight percent. This herbicidal composition is highly advantageous for aquatic herbicidal applications, and additionally has pest control character.

In still other embodiments, the herbicidal composition may comprise the MCT oil-based soap containing $C_8$ and $C_{10}$ fatty acids, in the amount of 20% to 90% by weight, and acetic acid aqueous solution in an amount of 10 to 80% by weight, and optionally 0-10% by weight of emulsifier, e.g. sodium lauryl sulfate, wherein all weight percents are based on total weight of the composition, and wherein all weight percents total to 100 weight percent. The acetic acid aqueous solution may contain any suitable amount of acetic acid, and preferably is dilute, containing 5-10% by weight acetic acid, based on weight of the acetic acid aqueous solution. Such herbicidal composition is particularly herbicidally effective for grass and broadleaf plants.

In another aspect, the disclosure relates to a method of combating unwanted plants and/or algae in a locus containing same, such method comprising applying to said unwanted plants or algae a cidally effective amount of a herbicidal composition comprising an MCT oil-based soap.

The herbicidal composition in such method may comprise in addition to the MCT oil-based soap, $C_8$ and $C_{10}$ free fatty acids, and citric acid, optionally with coconut oil soap containing $C_6$, $C_8$, $C_{10}$, and $C_{12}$ fatty acids, and optionally with one or more of soybean oil, soy methyl ester, water, and emulsifier, as described hereinabove.

In other embodiments, the method may comprise applying the herbicidal composition to unwanted plants comprising aquatic plants, in which the herbicidal composition comprises in addition to the MCT oil-based soap, $C_8$, $C_{10}$, and $C_{12}$ free fatty acids, and optionally one or more of coconut oil soap containing $C_6$, $C_8$, $C_{10}$, and $C_{12}$ fatty acids, soybean oil, soy methyl ester, water, emulsifier, glycerin, and preservative, as also described hereinabove.

In still other embodiments, the method may comprise applying the herbicidal composition to unwanted plants comprising at least one of grass and broadleaf plants, wherein the herbicidal composition comprises, in addition to the MCT oil-based soap, acetic acid, water, and optionally emulsifier, as described hereinabove.

A further aspect of the disclosure relates to a method of combating unwanted plants in a locus containing same, such method comprising applying to said unwanted plants a cidally effective amount of a herbicidal composition comprising an MCT oil-based soap, wherein the unwanted plants comprise woody stem plants, and prior to applying such herbicidal composition to the unwanted plants, applying to the unwanted plants a woody stem penetrant formulation comprising soy methyl ester and emulsifier. The woody stem penetrant formulation may comprise as the emulsifier sodium lauryl sulfate, glycerol monostearate, palmitic acid, or other emulsifier species or combination of species.

The disclosure also contemplates insect control compositions comprising coconut oil soap, e.g., a coconut oil soap containing $C_6$, $C_8$, $C_{10}$, and $C_{12}$ fatty acids. The insect control composition may further comprise MCT oil-based soap in various embodiments. In other embodiments, the insect control composition may comprise free fatty acids including at least $C_8$, $C_{10}$, and $C_{12}$ free fatty acids, e.g., wherein the free fatty acids comprise: from 2 weight percent to 10 weight percent $C_8$ free fatty acid; from 2 weight percent to 10 weight percent $C_{10}$ free fatty acid; and from 0 weight percent to 8 weight percent $C_{12}$ free fatty acid. In all insect control compositions described herein, as in the previously described herbicidal compositions, all weight percents are based on total weight of the composition, and all weight percents of all ingredients of the composition total to 100 weight percent.

In various embodiments, the insect control composition may comprise any one or more of citric acid, water, emulsifier (e.g., sodium lauryl sulfate), essential oil(s) (e.g., one or more of cedarwood oil, geranium oil, citronella, lemongrass oil, limonene, citrus grasses, citrol, and citronellol), glycerol monostearate, palmitic acid, preservative, and sodium bicarbonate, and the insect control composition may in various embodiments explicitly exclude one or more of such ingredients.

In various embodiments of such insect control composition, the coconut oil soap may be present in an amount of 20-100% by weight, based on weight of the composition.

The insect control composition in various embodiments comprises the coconut oil soap and optionally further comprises one or more of soybean oil, water, emulsifier, and essential oil(s).

In various other embodiments, the insect control composition comprises, in addition to the coconut oil soap, citric acid, glycerol monostearate, and palmitic acid, and further optionally comprises one of more of MCT oil-based soap, free fatty acids including at least $C_8$, $C_{10}$, and $C_{12}$ free fatty acids, soybean oil, water, essential oil(s), preservative, and sodium bicarbonate.

Thus, in particular embodiments, the insect control composition may include, in addition to the coconut oil soap any one or more of the optional ingredients of soybean oil, water, emulsifier, and essential oil, wherein soybean oil when present may be in an amount of 0-60% by weight, water when present may be present in an amount of 0-80% by weight, emulsifier when present may be present in an amount of 0-10% by weight, and essential oil(s) when present may be present in an amount of 0-40% by weight, wherein all weight percents are based on total weight of the composition, and wherein all weight percents of all ingredients of the composition total to 100 weight percent. In a specific embodiment, the insect control composition may comprise coconut oil soap in combination with emulsifier such as sodium lauryl sulfate in an amount of 5-10% by weight, on the same composition weight basis.

The insect control composition in still other embodiments may comprise coconut oil soap, free fatty acids including at least $C_8$, $C_{10}$, and $C_{12}$ free fatty acids, citric acid, glycerol monostearate and palmitic acid, optionally further comprising MCT oil-based soap soybean oil, water, essential oil(s), and sodium bicarbonate. In such embodiments, the coconut oil soap may be present in an amount of 5-80% by weight, the MCT soap when present may be present in an amount of 0-50% by weight, the free fatty acids may comprise: from 2 weight percent to 10 weight percent $C_8$ free fatty acid; from 2 weight percent to 10 weight percent $C_{10}$ free fatty acid; and from 0 weight percent to 8 weight percent $C_{12}$ free fatty acid, the soybean oil when present may be present in an amount of 0-60% by weight, the citric acid may be present in an amount of 1-20% by weight, water when present may be present in an amount of 0-80% by weight, essential oil(s) when present may be present in a total amount of 0-10% by weight, glycerol monostearate may be present in an amount of 1-8% by weight, palmitic acid may be present in an amount of 0.5-2% by weight, sodium bicarbonate when present may be present in an amount of 0-2% by weight, and preservative when present may be present in any suitable amount.

The disclosure further contemplates a method of controlling unwanted insects and/or arthropods in a locus containing or susceptible to incursion of same, such method comprising applying to the locus an insect controllingly effective amount of an insect control composition of the present disclosure as variously described hereinabove.

For example, the method may be conducted with an insect control composition comprising coconut oil soap, and optionally comprising one or more of soybean oil, water, emulsifier, and essential oil(s). Such method is usefully employed to control arthropods and insects in loci such as yards, gardens, homes, buildings, livestock and pets and humans. In such compositions, cedarwood oil and/or soybean oil may be utilized as pest-control active ingredients.

In another illustrative example, the method may be conducted with an insect control composition comprising coconut oil soap, citric acid, glycerol monostearate, and palmitic acid, and further optionally comprising one of more of MCT oil-based soap, free fatty acids including at least $C_8$, $C_{10}$, and $C_{12}$ free fatty acids, soybean oil, water, essential oil(s), preservative, and sodium bicarbonate. Such method may be used to control insects as an insect repellent method in which the insect control composition is applied to human skin, clothing, gear and objects in the locus in which insect control is desired.

In these illustrative method examples, the amounts of the various ingredients in the compositions may be as correspondingly described hereinabove.

It will therefore be appreciated that the present disclosure provides a wide variety of herbicidal and insect/pest control and repellent compositions and methods. It is to be recognized that coconut oil soap compositions of the present disclosure may be constituted as non-phytotoxic compositions to control insects on vegetation, while preserving the vegetation without negative impact. In this respect, the phytotoxicity of compositions of the present disclosure can be controlled based on the fatty acid profiles and selection of the soap feedstock utilized to make the composition. In this respect, coconut oil soap is not phytotoxic per se, but with increasing concentrations of free fatty acids, coconut oil soap-based compositions can be made more phytotoxic. MCT oil-based soap, being phytotoxic, may be employed to impart a desired phytotoxic character to specific compositions. It will be appreciated that the compositions of the present disclosure may be widely varied in phytotoxic or non-phytotoxic character, depending on the specific soap feedstock and fatty acid profiles that are employed.

Coconut oil soap as utilized in the various herbicidal and insecticidal/pesticidal compositions described herein may be manufactured according to the following illustrative procedure, which can be correspondingly scaled to the volume requirements for a given coconut oil soap product.

In an illustrative procedure, 1320 pounds of water is introduced to a clean tank, together with 686 pounds of coconut oil. The tank then is heated to 130° F. with sweep mixing, following which potassium hydroxide (KOH) is added in an amount of 194 pounds and heating is continued for two hours with sweep mixing. Yield is 270 gallons of coconut oil soap.

In a corresponding method, MCT oil-based soap may be formed by introducing 1320 pounds water to a clean tank, together with 641 pounds of MCT coconut oil. The tank is then heated to a temperature of 130° F. with sweep mixing, following which to hundred 39 pounds of potassium hydroxide (KOH) is added and heating at 130° F. is continued for two hours with sweep mixing. Yield is 270 gallons of MCT oil-based soap.

MCT triglyceride oils usefully employed for the compositions of the present disclosure include Radiamuls MCT 2109K (commercially available from Oleon NV, Ertvelde, Belgium), Masester E6000 US01-2 (commercially available from PT. Musim Mas, Medan, Indonesia), and MCT Oil 60/40 (commercially available from J. Edwards International, Inc.).

pH modification and/or acidulation may be carried out to achieve effective free fatty acid content in soaps utilized in the compositions of the present disclosure by a procedure such as the following. The content of citric acid or acetic acid needed to modify the soap content to the desired amount of free fatty acids is calculated. The acid calculation can be estimated that 30% (a range of 25 to 35% depending on the acid used and the final pH desired) of the soap stock (the oil content used to make the soap). Other acids can be used at a lower rate, however, citric acid and acetic acid are preferred due to their low toxicity characteristics in relation to animals and the environment, and the minimal risks in processing associated with weak acids, as well as allowability by the United States Environmental Protection Agency under pesticide inert list 4A.

The acid is added to the soap under agitation until a distinct separation of a water phase is achieved or until a desired pH is reached. The water can be drawn off and discarded or used as a fertilizer material (aqueous potassium citrate with glycerin) or it can be emulsified using sodium lauryl sulfate (SLS) and/or other emulsifier(s). MCT soap with acetic acid or vinegar remains a solution, and can be used as an aqueous solution.

Soaps utilized in the herbicidal and insecticidal compositions of the present disclosure may contain up to 5% by weight glycerin, based on weight of the soap, as well as potassium citrate and from 40 to 60 weight percent water, which may be removed after pH modification and/or acidulation, so that the resulting soaps contain free fatty acids.

Herbicidal compositions in accordance with the present disclosure desirably have pH of 3-5. Insect repellent compositions of the present disclosure desirably have a pH of 6-7, and insecticidal soaps of the disclosed compositions desirably have pH of 8-11. In the compositions of the present disclosure, soaps with specific free fatty acid profiles and ranges of free fatty acid concentrations are utilized along with synergistic oils to enable rapid penetration of both vegetation and insects, as well as removal of protective waxes and coatings that prevent penetration of the free fatty acids into the cell structure.

Rather than a systemic mode of action, the orientation of the present disclosure is to provide a non-systemic mode of action whereby resistance cannot be built up by the target vegetation or insects or arthropods over time, and with the objective that the active ingredients and mechanism of penetration do not negatively affect animals and the environment.

Insect control compositions of the present disclosure may optionally include oils such as cedarwood oil, geranium oil, geraniol, lemongrass oil, and citronella oil, e.g., in concentrations of 0.5-5% by weight, based on the total composition weight.

The present disclosure variously contemplates herbicidal compositions including the following: (I) MCT soap with free fatty acids $C_8$ and/or $C_{10}$ and/or $C_{12}$; (II) coconut oil soap with free fatty acids $C_8$ and/or $C_{10}$ and/or $C_{12}$; (III) MCT soap and coconut oil soap with free fatty acids $C_8$ and/or $C_{10}$ and/or $C_{12}$; (IV) the foregoing compositions with sodium lauryl sulfate added; (V) sodium laurel sulfate and free fatty acids $C_8$ and/or $C_{10}$ and/or $C_{12}$; (VI) all of the foregoing with modified vegetable oil as a penetrant and solvent for woody stem plants; and (VII) all of the foregoing with added herbicidal actives, e.g., natural active ingredients such as cedarwood oil.

In some instances, it may be desirable to utilize $C_9$ fatty acid as a further ingredient in herbicidal compositions of the present disclosure, since such ingredient is herbicidally effective for certain weeds.

For a sustainable herbicide, it is imperative to develop an effective herbicidal action that is not systemic, in order to control vegetation without detrimental effects to the bee and pollinator populations. Moreover, a sustainable choice also provides a mode of action to which vegetation cannot adapt a resistance and which is not detrimental to humans and animals. The compositions of the present disclosure provide natural formulations and employ natural compounds that are not deleterious to decimate bee and pollinator populations. Compositions of the present disclosure provide applications for recycling of sustainable vegetable oils into effective vegetation control formulations that variously provide selective or non-selective contact herbicides with a non-systemic mode of action that are environmentally benign.

MCT oils and/or coconut oil soap may be utilized to supplement or alternatively to replace sodium lauryl sulfate and modified vegetable oil ingredients in compositions of the present disclosure. The herbicidal efficacy of herbicidal compositions of the present disclosure may be augmented by utilizing other oils known to possess herbicidal activity, such as cedarwood oil.

The vegetable fatty acid profiles and formulations and methods described herein may also be employed in compositions including other herbicidal actives in order to improve the effect of such actives.

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:
1. An aqueous herbicidal composition, comprising:
 (i) a medium chain triglyceride (MCT) oil-based soap;
 (ii) free fatty acids including at least $C_8$ and $C_{10}$ free fatty acids;

(iii) glycerin; and
(iv) citric acid or acetic acid,
wherein the composition has at least one of the following characteristics (A) and (B):
  (A) said free fatty acids comprising from 2 weight percent to 50 weight percent $C_8$ free fatty acid; from 2 weight percent to 50 weight percent $C_{10}$ free fatty acid; and from 0 weight percent to 8 weight percent $C_{12}$ free fatty acid, based on the total weight of the $C_8$ free fatty acid, the $C_{10}$ free fatty acid, and the $C_{12}$ free fatty acid, wherein the weight percentages of the $C_8$ free fatty acid, the $C_{10}$ free fatty acid, and the $C_{12}$ free fatty acid total to 100 weight percent; and
  (B) a pH in a range of from 3 to 5.

2. The aqueous herbicidal composition of claim 1, comprising citric acid.

3. The aqueous herbicidal composition of claim 1, wherein the MCT oil-based soap is derived from coconut oil and/or palm oil.

4. The aqueous herbicidal composition of claim 2, wherein the free fatty acids comprise:
  from 2 weight percent to 50 weight percent $C_8$ free fatty acid;
  from 2 weight percent to 50 weight percent $C_{10}$ free fatty acid; and
  from 0 weight percent to 8 weight percent $C_{12}$ free fatty acid,
  based on the total weight of the $C_8$ free fatty acid, the $C_{10}$ free fatty acid, and the $C_{12}$ free fatty acid, and wherein the weight percentages of the $C_8$ free fatty acid, the $C_{10}$ free fatty acid, and the $C_{12}$ free fatty acid total to 100 weight percent.

5. The aqueous herbicidal composition of claim 1, wherein $C_8$ free fatty acid and $C_{10}$ free fatty acid together comprise from 5 weight percent to 100 weight percent of the free fatty acids in the herbicidal composition.

6. The aqueous herbicidal composition of claim 1, containing from 5 to 95 weight percent MCT oil-based soap, based on total weight of the herbicidal composition.

7. The aqueous herbicidal composition of claim 1, further comprising coconut oil soap containing $C_6$, $C_8$, $C_{10}$, and $C_{12}$ fatty acids.

8. The aqueous herbicidal composition of claim 7, comprising from 1 to 60 weight percent of coconut oil soap, based on total weight of the herbicidal composition.

9. The aqueous herbicidal composition of claim 1, having a pH in a range of from 3 to 5.

10. The aqueous herbicidal composition of claim 1, comprising free fatty acids that have been formed by pH modification and/or acidulation of the MCT oil-based soap.

11. The aqueous herbicidal composition of claim 1, further comprising free fatty acids that are non-derived from the MCT oil-based soap.

12. The aqueous herbicidal composition of claim 1, further comprising one or more ingredients selected from the group consisting of soybean oil, soy methyl ester, emulsifier, essential oils, preservatives, and sodium bicarbonate.

13. The aqueous herbicidal composition of claim 1, further comprising one or more of coconut oil soap containing $C_6$, $C_8$, $C_{10}$, and $C_{12}$ fatty acids, soybean oil, soy methyl ester, and emulsifier.

14. The aqueous herbicidal composition of claim 1, further comprising $C_{12}$ free fatty acids, and optionally one or more of coconut oil soap containing $C_6$, $C_8$, $C_{10}$, and $C_{12}$ fatty acids, soybean oil, soy methyl ester, emulsifier, and preservative.

15. The aqueous herbicidal composition of claim 1, further comprising emulsifier.

16. The aqueous herbicidal composition of claim 1, comprising acetic acid.

17. The aqueous herbicidal composition of claim 1, further comprising lauric acid.

18. The aqueous herbicidal composition of claim 1, further comprising glycerol monostearate.

19. An aqueous herbicidal composition, comprising:
  (i) a medium chain triglyceride (MCT) oil-based soap;
  (ii) free fatty acids including at least $C_8$ and $C_{10}$ free fatty acids;
  (iii) glycerin;
  (iv) citric acid or acetic acid;
  (v) lauric acid; and
  (vi) glycerol monostearate,
wherein the composition has at least one of the following characteristics (A) and (B):
  (A) said free fatty acids comprising from 2 weight percent to 50 weight percent $C_8$ free fatty acid; from 2 weight percent to 50 weight percent $C_{10}$ free fatty acid; and from 0 weight percent to 8 weight percent $C_{12}$ free fatty acid, based on the total weight of the $C_8$ free fatty acid, the $C_{10}$ free fatty acid, and the $C_{12}$ free fatty acid, wherein the weight percentages of the $C_8$ free fatty acid, the $C_{10}$ free fatty acid, and the $C_{12}$ free fatty acid total to 100 weight percent; and
  (B) a pH in a range of from 3 to 5.

20. A method of combating unwanted plants and/or algae in a locus containing same, said method comprising applying to said unwanted plants and/or algae a cidally effective amount of the aqueous herbicidal composition of claim 1.

21. The method of claim 20, wherein the aqueous herbicidal composition further comprises coconut oil soap containing $C_6$, $C_8$, $C_{10}$, and $C_{12}$ fatty acids, and optionally one or more of soybean oil, soy methyl ester, and emulsifier.

22. The method of claim 20, comprising applying the aqueous herbicidal composition to said unwanted plants, wherein said unwanted plants comprise aquatic plants, and wherein the herbicidal composition further comprises $C_{12}$ free fatty acids, and optionally one or more of coconut oil soap containing $C_6$, $C_8$, $C_{10}$, and $C_{12}$ fatty acids, soybean oil, soy methyl ester, emulsifier, and preservative.

23. The method of claim 20, comprising applying the aqueous herbicidal composition to said unwanted plants, wherein said unwanted plants comprise at least one of grass and broadleaf plants, and wherein the herbicidal composition further comprises emulsifier.

24. The method of claim 20, comprising applying the aqueous herbicidal composition to said unwanted plants, wherein said unwanted plants comprise woody stem plants, and prior to applying the herbicidal composition to said unwanted plants, applying to said unwanted plants a woody stem penetrant formulation comprising soy methyl ester and emulsifier.

* * * * *